United States Patent
Hayashi

(10) Patent No.: US 11,394,295 B2
(45) Date of Patent: Jul. 19, 2022

(54) POWER SUPPLY APPARATUS

(71) Applicant: TOSHIBA MITSUBISHI-ELECTRIC INDUSTRIAL SYSTEMS CORPORATION, Chuo-ku (JP)

(72) Inventor: Yousuke Hayashi, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 321 days.

(21) Appl. No.: 16/650,573

(22) PCT Filed: Sep. 27, 2017

(86) PCT No.: PCT/JP2017/034861
§ 371 (c)(1),
(2) Date: Mar. 25, 2020

(87) PCT Pub. No.: WO2019/064361
PCT Pub. Date: Apr. 4, 2019

(65) Prior Publication Data
US 2020/0235655 A1   Jul. 23, 2020

(51) Int. Cl.
*H02M 5/458* (2006.01)
*H02M 1/42* (2007.01)
*H02M 7/219* (2006.01)
(Continued)

(52) U.S. Cl.
CPC ......... *H02M 1/4216* (2013.01); *H02J 3/0073* (2020.01); *H02M 1/123* (2021.05);
(Continued)

(58) Field of Classification Search
CPC ........ H02M 1/12; H02M 1/123; H02M 1/325; H02M 1/42; H02M 1/4216; H02M 5/4585;
(Continued)

(56) References Cited

U.S. PATENT DOCUMENTS

| | | | | |
|---|---|---|---|---|
| 6,605,879 B2 * | 8/2003 | Wade | ...................... | H02J 9/062 307/66 |
| 2003/0227785 A1 * | 12/2003 | Johnson, Jr. | .............. | H02J 9/06 363/37 |
| 2004/0160792 A1 * | 8/2004 | Youm | ..................... | H02M 1/36 363/37 |

(Continued)

FOREIGN PATENT DOCUMENTS

| | | |
|---|---|---|
| JP | 2009-124836 A | 6/2009 |
| WO | WO 2011/036767 A1 | 3/2011 |
| WO | WO 2013/145248 A1 | 10/2013 |

OTHER PUBLICATIONS

International Search Report dated Nov. 14, 2017 in PCT/JP2017/034861 filed Sep. 27, 2017, citing documents AA, AB, AO, and AP therein, 2 pages.

(Continued)

*Primary Examiner* — Gary L Laxton
(74) *Attorney, Agent, or Firm* — Oblon, McClelland, Maier & Neustadt, L.L.P.

(57) ABSTRACT

In this uninterruptible power supply apparatus, respective phase differences between first to third carrier wave signals (CS1 to CS3) for a converter (1) and fourth to sixth carrier wave signals (CS4 to CS6) for an inverter (2) are set to 180 degrees in an inverter power feed mode and a bypass power feed mode, and respective phase differences between the first to third carrier wave signals and the fourth to sixth carrier wave signals are set to 0 degree in an overlap power feed mode. Zero-phase current (I01, I02) and circulating current (ICL) therefore can be reduced.

7 Claims, 18 Drawing Sheets

(51) Int. Cl.
| | |
|---|---|
| *H02M 7/5387* | (2007.01) |
| *H02P 27/08* | (2006.01) |
| *H02M 1/12* | (2006.01) |
| *H02M 1/32* | (2007.01) |
| *H02J 3/00* | (2006.01) |
| *H02J 9/06* | (2006.01) |

(52) U.S. Cl.
CPC ......... *H02M 1/325* (2021.05); *H02M 5/4585* (2013.01); *H02M 7/219* (2013.01); *H02M 7/53875* (2013.01); *H02P 27/085* (2013.01); *H02M 1/12* (2013.01)

(58) Field of Classification Search
CPC ............... H02M 7/53875; H02M 7/219; H02J 3/0073; H02J 9/06; H02J 9/062
See application file for complete search history.

(56) References Cited

U.S. PATENT DOCUMENTS

| | | | |
|---|---|---|---|
| 2004/0223347 A1* | 11/2004 | Kobayashi | H02J 9/062 363/37 |
| 2012/0217809 A1 | 8/2012 | Sato et al. | |
| 2015/0016155 A1 | 1/2015 | Lee et al. | |

OTHER PUBLICATIONS

Indian Office Action dated Nov. 8, 2021 in Indian Patent Application No. 202017017172 (with English translation), citing document AO therein, 5 pages.

\* cited by examiner

FIG.11

| GATE SIGNAL | X1 | 0 | 1 | 1 | 0 | 0 | 0 | 1 | 1 |
|---|---|---|---|---|---|---|---|---|---|
| | X2 | 0 | 0 | 1 | 1 | 1 | 0 | 0 | 1 |
| | X3 | 0 | 0 | 0 | 0 | 1 | 1 | 1 | 1 |
| VOLTAGE VECTOR | | E(000) | E(100) | E(110) | E(010) | E(011) | E(001) | E(101) | E(111) |

POWER SUPPLY APPARATUS

TECHNICAL FIELD

The present invention relates to a power supply apparatus and more particularly to a power supply apparatus including a forward converter and a reverse converter.

BACKGROUND ART

For example, WO2013/145248 (PTL 1) discloses a power supply apparatus including a forward converter converting first AC power from a commercial AC power supply to DC power, a reverse converter converting the DC power to second AC power to supply the second AC power to a load, a first comparator comparing a first voltage command value corresponding to input voltage of the forward converter with a first carrier wave signal and generating a first control signal for controlling the forward converter based on the comparison result, and a second comparator comparing a second voltage command value corresponding to output voltage of the reverse converter with a second carrier wave signal and generating a second control signal for controlling the reverse converter base on the comparison result.

In this power supply apparatus, a phase difference between the first and second carrier wave signals is set to 180 degrees. Thus, the polarity of first zero-phase current (see FIG. 14) flowing from the forward converter to the ground line and the polarity of second zero-phase current (see FIG. 14) flowing from the reverse converter to the ground line can be reversed from each other, and a zero-phase harmonic component generated from the power supply apparatus can be reduced.

For example, WO2011/036767 (PTL 2) discloses a power supply apparatus including a forward converter converting first AC power from a commercial AC power supply to DC power, a reverse converter converting the DC power to second AC power, a first switch connected between the reverse converter and a load, and a second switch connected between an AC power supply and the load.

This power supply apparatus performs any one of power feed modes including: a first power feed mode in which the first switch is turned on, the second switch is turned off, and the second AC power is supplied to the load; a second power feed mode in which the first and second switches are turned on and the first and second AC powers are supplied to the load; and a third power feed mode in which the first switch is turned off, the second switch is turned on, and the first AC power is supplied to the load.

CITATION LIST

Patent Literature

PTL 1: WO2013/145248
PTL 2: WO2011/036767

SUMMARY OF INVENTION

Technical Problem

However, when the technique in PTL 1 is applied to the power supply apparatus in PTL 2, circulating current may flow through a path from the output node of the reverse converter to the input node of the reverse converter through the first switch, the second switch, and the forward converter, in the second power feed mode, and wiring may generate heat (see FIG. 18).

A main object of the present invention is therefore to provide a power supply apparatus capable of reducing a zero-phase harmonic component and reducing circulating current.

Solution to Problem

A power supply apparatus according to the present invention includes: a forward converter that converts first AC power supplied from a commercial AC power supply to DC power, a reverse converter that converts DC power to second AC power having a commercial frequency; a first switch connected between the reverse converter and a load; a second switch connected between the commercial AC power supply and the load; a first control unit that performs any one of power feed modes including a first power feed mode, a second power feed mode, and a third power feed mode; and a second control unit that controls each of the forward converter and the reverse converter. In the first power feed mode, the first switch is turned on, the second switch is turned off, and the second AC power is supplied to the load. In the second power feed mode, the first and second switches are turned on and the first and second AC powers are supplied to the load. In the third power feed mode, the first switch is turned off, the second switch is turned on, and the first AC power is supplied to the load. The second control unit includes a first voltage command unit, a second voltage command unit, a signal generating unit, a first comparison unit, and a second comparison unit. The first voltage command unit generates a first voltage command value corresponding to AC voltage input to the forward converter. The second voltage command unit generates a second voltage command value corresponding to AC voltage output from the reverse converter. The signal generating unit generates first and second carrier wave signals. The first comparison unit compares the first voltage command value with the first carrier wave signal and generates a first control signal for controlling the forward converter based on a comparison result. The second comparison unit compares the second voltage command value with the second carrier wave signal and generates a second control signal for controlling the reverse converter based on a comparison result. The signal generating unit sets a phase difference between the first and second carrier wave signals to 180 degrees in the first and third power feed modes and matches phases of the first and second carrier wave signals in the second power feed mode.

Advantageous Effects of Invention

In the power supply apparatus according to the present invention, in the first and third power feed modes, the phase difference between the first and second carrier wave signals is set to 180 degrees, so that a zero-phase harmonic component produced from the power supply apparatus can be reduced. In the second power feed mode, the first and second carrier wave signals are matched in phase, so that circulating current can be reduced.

BRIEF DESCRIPTION OF DRAWINGS

FIG. 2 is a time chart illustrating the operation of switches S1 to S6 shown in

FIG. 1.

FIG. 11 is a diagram for explaining the correspondence between the combinations of values of gate signals X1 to X3 and voltage vectors.

DESCRIPTION OF EMBODIMENTS

Figure 1:
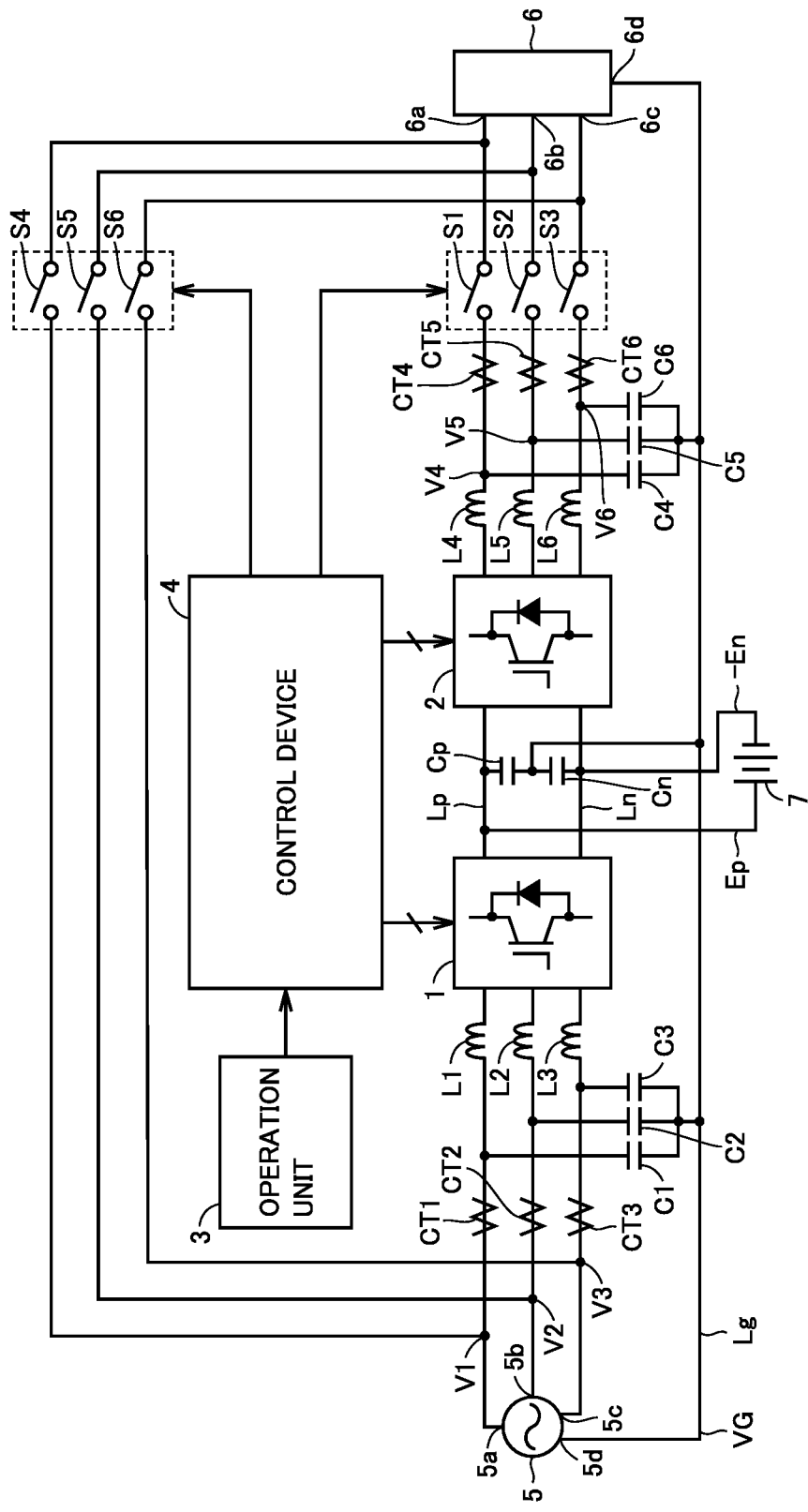
FIG. 1 is a circuit block diagram showing a configuration of an uninterruptible power supply apparatus according to an embodiment of the present invention.

FIG. 1 is a circuit block diagram showing a configuration of an uninterruptible power supply apparatus according to an embodiment of the present invention. In FIG. 1, the uninterruptible power supply apparatus includes capacitors C1 to C6, Cp, and Cn, reactors L1 to L6, current detectors CT1 to CT6, a converter 1, a DC positive bus Lp, a DC negative bus Ln, an inverter 2, an operation unit 3, and a control device 4. This uninterruptible power supply apparatus receives three-phase AC power having a commercial frequency from a commercial AC power supply 5 and supplies three-phase AC power having a commercial frequency to a load 6.

Commercial AC power supply 5 is a three-phase four-wire system and outputs three phase AC voltages V1 to V3 and ground voltage VG to AC output terminals 5a to 5c and a ground terminal 5g, respectively. Load 6 is a three-phase four-wire system and includes AC input terminals 6a to 6c and a ground terminal 6d. Ground terminal 5d of commercial AC power supply 5 is connected to ground terminal 6g of load 6 through a ground line Lg.

Capacitors C1 to C3 each have one electrode connected to the corresponding one of AC output terminals 5a to 5c of commercial AC power supply 5 and have the other electrodes connected together to ground line Lg. Reactors L1 to L3 each have one terminal connected to the corresponding one of AC output terminals 5a to 5c of commercial AC power supply 5 and have the other terminals connected to three input nodes of converter 1.

Capacitors C1 to C3 and reactors L1 to L3 constitute a low pass filter, allow AC current having a commercial frequency to flow from commercial AC power supply 5 to converter 1, and prevent a signal having a switching frequency from flowing from converter 1 to commercial AC power supply 5.

Instantaneous values of three phase AC voltages V1 to V3 from commercial AC power supply 5 are detected by control device 4. Current detectors CT1 to CT3 detect AC currents I1 to I3 flowing through reactors L1 to L3, respectively, and apply signals indicating the detected values to control device 4.

The positive-side output node of converter 1 is connected to the positive-side input node of inverter 2 through DC positive bus Lp. The negative-side output node of converter 1 is connected to the negative-side input node of inverter 2 through DC negative bus Ln. Capacitors Cp and Cn are connected in series between buses Lp and Ln and smooth DC voltage between buses Lp and Ln. The node between capacitors Cp and Cn is connected to ground line Lg.

A battery 7 (power storage device) is connected between DC positive bus Lp and DC negative bus Ln. Battery 7 stores DC power. Instead of battery 7, a capacitor may be connected. DC voltage Ep of DC positive bus Lp and DC voltage (−En) of DC negative bus Ln are detected by control device 4. In other words, terminal-to-terminal voltage Ep of capacitor Cp and terminal-to-terminal voltage En of capacitor Cn are detected by control device 4.

Converter 1 is controlled by control device 4 and converts three-phase AC power from commercial AC power supply 5 to DC power in a sound state in which three-phase AC power is supplied normally from commercial AC power supply 5. DC power generated by converter 1 is supplied to inverter 2 through buses Lp and Ln and stored in battery 7.

At this time, converter 1 outputs current such that DC voltage E=Ep+En between buses Lp and Ln attains a predetermined reference DC voltage Er. DC voltage E is thus kept constant, and each of DC voltages Ep and En is kept at E/2. In a power failure in which supply of three-phase AC power from commercial AC power supply 5 is stopped, the operation of converter 1 is stopped. Capacitors C1 to C3, reactors L1 to L3, and converter 1 constitute a forward converter that converts three-phase AC power from commercial AC power supply 5 to DC power.

Inverter 2 is controlled by control device 4 and converts DC power from converter 1 to three-phase AC power having a commercial frequency in a sound state in which three-phase AC power is supplied normally from commercial AC power supply 5. In a power failure in which supply of three-phase AC power from commercial AC power supply 5 is stopped, inverter 2 converts DC power of battery 7 to three-phase AC power having a commercial frequency.

Three output nodes of inverter 2 are each connected to one terminal of the corresponding one of reactors L4 to L6. The other terminals of reactors L4 to L6 are each connected to one terminal of the corresponding one of switches S1 to S3, and the other terminals of switches S1 to S3 are respectively connected to three AC input terminals 6a to 6c of load 6. One electrode of each of capacitors C4 to C6 is connected to the other electrode of the corresponding one of reactors L4 to L6, and the other electrodes of capacitors C4 to C6 are connected together to ground line Lg.

Capacitors C4 to C6 and reactors L4 to L6 constitute a low pass filter, allow AC current having a commercial frequency to flow from inverter 2 to load 6, and prevent a signal having a switching frequency from flowing from inverter 2 to load 6. In other words, capacitors C4 to C6 and reactors L4 to L6 convert three phase rectangular wave voltages output from inverter 2 to sinusoidal three phase AC voltages V4 to V6.

Instantaneous values of three phase AC voltages V4 to V6 are detected by control device 4. Current detectors CT4 to CT6 detect AC currents I4 to I6 flowing through reactors L4 to L6, respectively, and apply signals indicating the detected values to control device 4.

Switches S4 to S6 each have one electrode connected to the corresponding one of AC output terminals 5a to 5c of commercial AC power supply 5 and the other terminal connected to the corresponding one of AC input terminals 6a to 6c of load 6. Switches S1 to S6 are controlled by control device 4.

In an inverter power feed mode (first power feed mode) in which three-phase AC power generated by inverter 2 is supplied to load 6, switches S1 to S3 are turned on, and switches S4 to S6 are turned off. In a bypass power feed mode (third power feed mode) in which three-phase AC power from commercial AC power supply 5 is supplied to load 6, switches S1 to S3 are turned off, and switches S4 to S6 are turned on. In an overlap power feed mode (second power feed mode) in which three-phase AC power is supplied from both of inverter 2 and commercial AC power supply 5 to load 6, switches S1 to S6 are turned on.

Operation unit 3 includes a plurality of buttons operated by the user of the uninterruptible power supply apparatus and an image display unit presenting a variety of information. The user can operate operation unit 3 to power on and off the uninterruptible power supply apparatus, select one of an automatic operation mode and a manual operation mode, and select any one of the bypass power feed mode, the inverter power feed mode, and the overlap power feed mode.

Control device 4 controls the entire uninterruptible power supply apparatus based on a signal from operation unit 3, AC input voltages V1 to V3, AC input currents I1 to I3, DC voltage E, AC output currents I4 to I6, AC output voltages V4 to V6, and the like. That is, control device 4 detects whether a power failure occurs based on the detected values of AC input voltages V1 to V3.

In the sound state in which three-phase AC power is supplied from commercial AC power supply 5, control device 4 selects the inverter power feed mode, turns on switches S1 to S3, and turns off switches S4 to S6. DC power generated by converter 1 is thus converted to three-phase AC power by inverter 2, and the three-phase AC power is supplied to load 6 through switches S1 to S3.

At the time of a power failure in which supply of three-phase AC power from commercial AC power supply 5 is stopped, control device 4 stops the operation of converter 1. DC power of battery 7 is thus converted to three-phase AC power by inverter 2, and the three-phase AC power is supplied to load 6 through switches S1 to S3. When terminal-to-terminal voltage E of battery 7 decreases to a discharge stop voltage, control device 4 further stops the operation of inverter 2 and turns off switches S1 to S3.

When inverter 2 is failed in a sound state of commercial AC power supply 5, control device 4 selects the overlap power feed mode and turns on switches S4 to S6 while keeping switches S1 to S3 in the ON state. Three-phase AC power is thus supplied from both of inverter 2 and commercial AC power supply 5 to load 6. After the elapse of a predetermined period of time, control device 4 selects the bypass power feed mode and turns off switches S1 to S3 while keeping switches S4 to S6 in the ON state. Three-phase AC power is thus supplied only from commercial AC power supply 5 to load 6.

Figure 2:
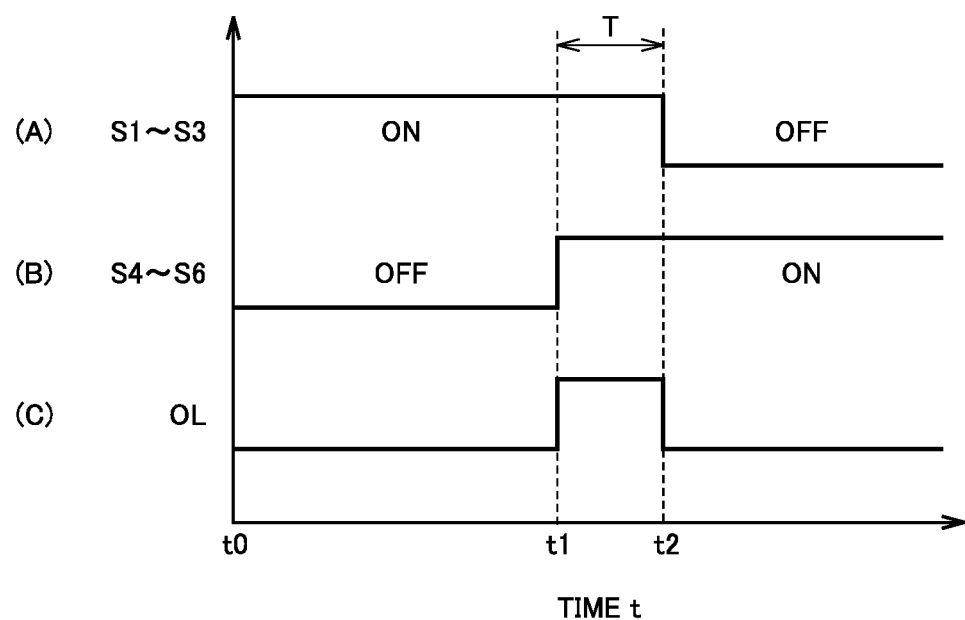

FIGS. 2(A) to 2(C) are time charts illustrating the operation of switches S1 to S6. Specifically, FIG. 2(A) shows the operation of switches S1 to S3, FIG. 2(B) shows the operation of switches S4 to S6, and FIG. 2(C) shows an overlap signal OL. Overlap signal OL is a signal generated by control device 4 and brought to the activation level "H" level in the overlap power feed mode.

In an initial state (time t0), it is assumed that three-phase AC power is supplied normally from commercial AC power supply 5, the inverter power feed mode is selected by control device 4, switches S1 to S3 are turned on, switches S4 to S6 are turned off, and overlap signal OL is set to the deactivation level "L" level.

When inverter 2 is failed at a certain time t1, the overlap power feed mode is selected by control device 4, switches S1 to S3 are kept in the ON state, switches S4 to S6 are turned on, and overlap signal OL is raised to the activation level "H" level.

At time t2 after the elapse of a predetermined period of time T from time t1, the bypass power feed mode is selected by control device 4, switches S1 to S3 are turned off, switches S4 to S6 are kept in the ON state, and overlap signal OL is lowered to the deactivation level "L" level.

Figure 3:
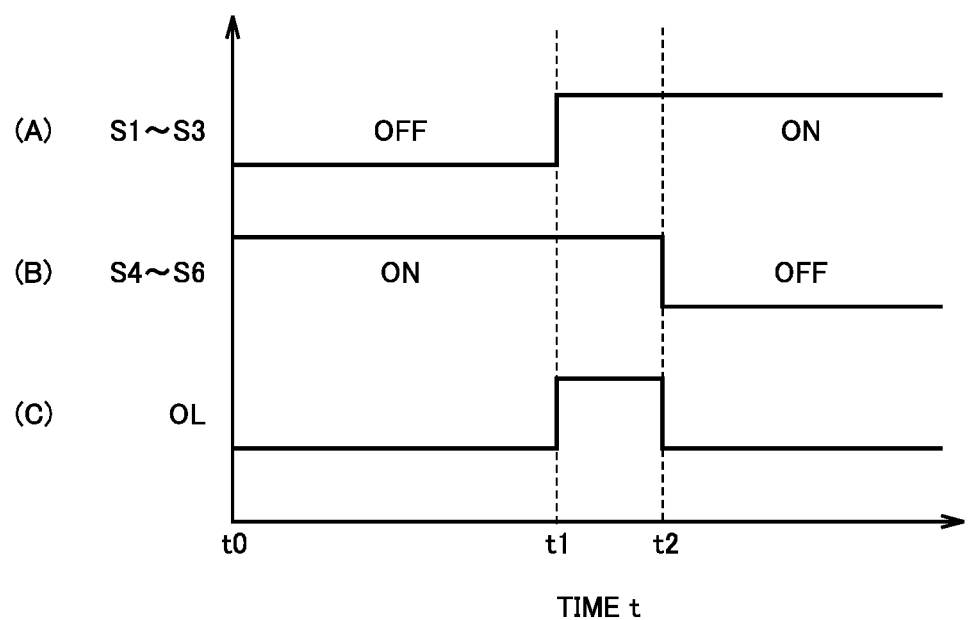
FIG. 3 is another time chart illustrating the operation of switches S1 to S6 shown in FIG. 1.

FIGS. 3(A) to 3(C) are other time charts illustrating the operation of switches S1 to S6. Specifically, FIG. 3(A) shows the operation of switches S1 to S3, FIG. 3(B) shows the operation of switches S4 to S6, and FIG. 3(C) shows overlap signal OL.

In an initial state (time t0), it is assumed that execution of the bypass power feed mode is specified by a signal from operation unit 3, switches S1 to S3 are turned off by control device 4, switches S4 to S6 are turned on, and overlap signal OL is set to the deactivation level "L" level.

When a transition to the inverter power feed mode is specified by a signal from operation unit 3 at a certain time t1, the overlap power feed mode is selected by control device 4, switches S1 to S3 are kept in the ON state, switches S4 to S6 are turned on, and overlap signal OL is raised to the activation level "H" level.

At time t2 after the elapse of a predetermined period of time T from time t1, the inverter power feed mode is selected by control device 4, switches S1 to S3 are kept in the ON state, switches S4 to S6 are turned off, and overlap signal OL is lowered to the deactivation level "L" level. A method of using overlap signal OL will be described later.

Returning to FIG. 1, control device 4 controls converter 1 and inverter 2 in synchronization with the phases of AC input voltages V1 to V3. More specifically, in a sound state in which three-phase AC power is supplied from commercial AC power supply 5, control device 4 controls converter 1 in synchronization with AC input voltages V1 to V3 such that DC voltage E attains reference DC voltage Er, and at the time of a power failure in which supply of three-phase AC power from commercial AC power supply 5 is stopped, control device 4 stops operation of converter 1. Control device 4 controls inverter 2 in synchronization with AC input voltages V1 to V3 such that AC output voltages V4 to V6 attain reference AC voltages V4r to V6r, respectively.

A basic operation of this uninterruptible power supply apparatus will now be described. In a sound state in which three-phase AC power is supplied normally from commercial AC power supply 5, the inverter power feed mode is selected, switches S1 to S3 are turned on, and switches S4 to S6 are turned off. Three-phase AC power supplied from commercial AC power supply 5 is converted to DC power by converter 1. DC power generated by converter 1 is stored in battery 7 and converted by inverter 2 to three-phase AC power having a commercial frequency, which is in turn supplied to load 6.

When supply of three-phase AC power from commercial AC power supply 5 is stopped, that is, a power failure occurs, the operation of converter 1 is stopped, and DC power of battery 7 is converted by inverter 2 to three-phase AC power having a commercial frequency, which is in turn supplied to load 6. Hence, the operation of load 6 can be continued for a period of time during which DC power is stored in battery 7.

When inverter 2 is failed in the inverter power feed mode, the overlap power feed mode is selected, switches S1 to S3 are kept in the ON state, and switches S4 to S6 are turned on. Three-phase AC power is thus supplied from both of commercial AC power supply 5 and inverter 2 to load 6.

After the elapse of a predetermined period of time T since inverter 2 is failed, the bypass power feed mode is selected, switches S4 to S6 are kept in the ON state, and switches S1 to S3 are turned off. Three-phase AC power is thus supplied from commercial AC power supply 5 to load 6, and the operation of load 6 is continued.

Figure 4:
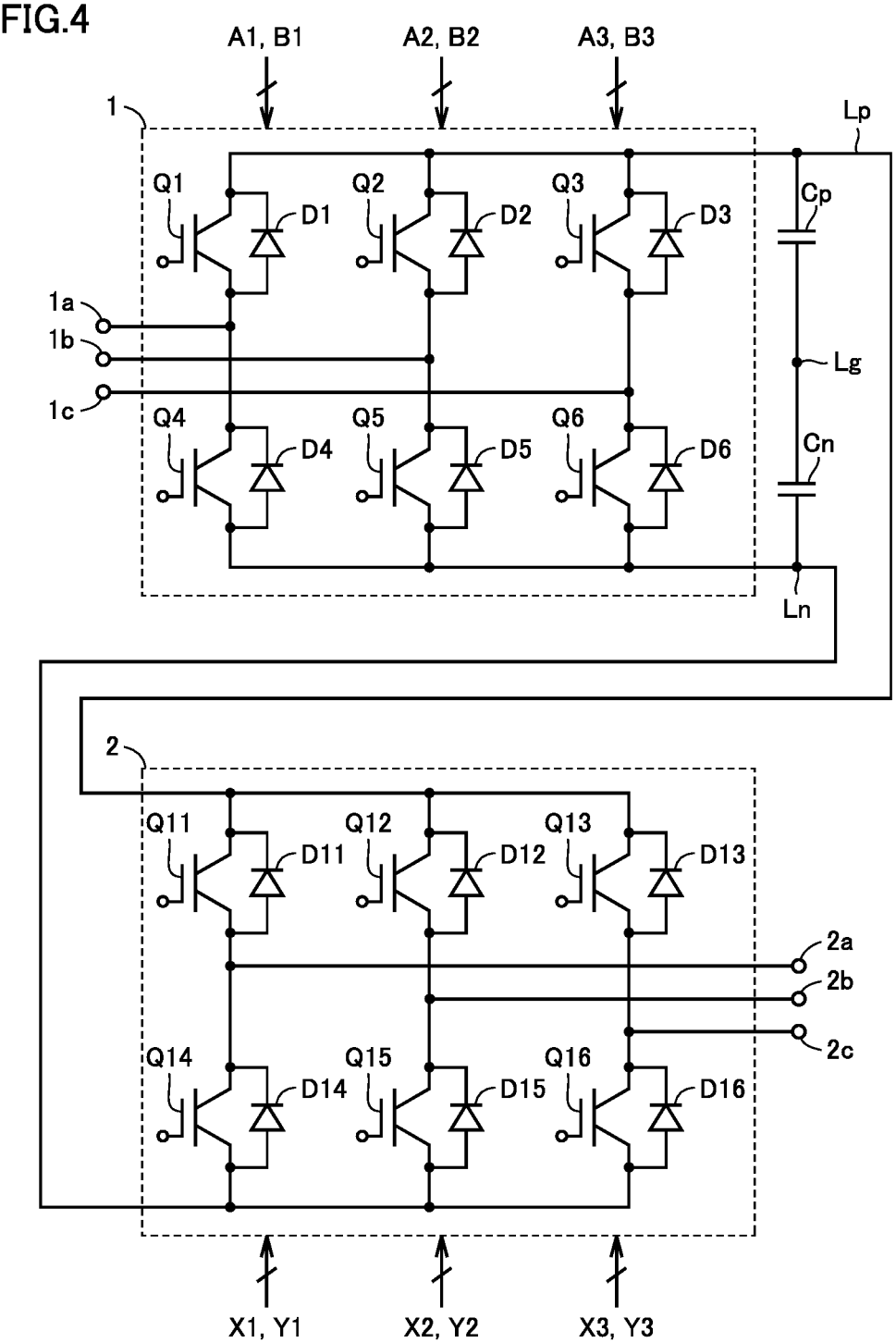
FIG. 4 is a circuit block diagram showing a configuration of a converter and an inverter shown in FIG. 1.

A method of controlling converter 1 and inverter 2 which is the feature of the subject application will now be described in detail. FIG. 4 is a circuit diagram showing a configuration of converter 1 and inverter 2. In FIG. 4, converter 1 includes IGBTs (Insulated Gate Bipolar Transistors) Q1 to Q6 and diodes D1 to D6. The IGBTs configure switching elements. The collectors of IGBTs Q1 to Q3 are connected together to DC positive bus Lp and the emitters thereof are connected to input nodes 1a, 1b, and 1c, respectively.

Input nodes 1a, 1b, and 1c are connected to the other terminals of reactors L1 to L3, respectively (FIG. 1). The collectors of IGBTs Q4 to Q6 are connected to input nodes 1a, 1b, and 1c, respectively, and the emitters thereof are connected together to DC negative bus Ln. Diodes D1 to D6 are connected in anti-parallel with IGBTs Q1 to Q6, respectively.

IGBTs Q1 and Q4 are controlled by gate signals A1 and B1, respectively, IGBTs Q2 and Q5 are controlled by gate signals A2 and B2, respectively, and IGBTs Q3 and Q6 are controlled by gate signals A3 and B3, respectively. Gate signals B1, B2, and B3 are inversion signals of gate signals A1, A2, and A3, respectively.

IGBTs Q1 to Q3 turn on when gate signals A1, A2, and A3 are brought to "H" level, respectively, and turn off when gate signals A1, A2, and A3 are brought to "L" level, respectively. IGBTs Q4 to Q6 turn on when gate signals B1, B2, and B3 are brought to "H" level, respectively, and turn off when gate signals B1, B2, and B3 are brought to "L" level, respectively.

Each of gate signals A1, B1, A2, B2, A3, and B3 is a pulse signal train and a PWM (Pulse Width Modulation) signal. The phase of gate signal A1, B1, the phase of gate signal A2, B2, and the phase of gate signal A3, B3 are basically shifted from each other by 120 degrees. Gate signals A1, B1, A2, B2, A3, and B3 are generated by control device 4. A method of generating gate signals A1, B1, A2, B2, A3, and B3 will be described later.

For example, when the level of AC input voltage V1 is higher than the level of AC input voltage V2, IGBTs Q1 and Q5 are turned on, and current flows from input node 1a to input node 1b through IGBT Q1, DC positive bus Lp, capacitors Cp and Cn, DC negative bus Ln, and IGBT Q5 to charge capacitors Cp and Cn.

Conversely, when the level of AC input voltage V2 is higher than the level of AC input voltage V1, IGBTs Q2 and Q4 are turned on, and current flows from input node 1b to input node 1a through IGBT Q2, DC positive bus Lp, capacitors Cp and Cn, DC negative bus Ln, and IGBT Q4 to charge capacitors Cp and Cn. This is the same in other cases.

Each of IGBTs Q1 to Q6 is turned on and off at a predetermined timing by gate signals A1, B1, A2, B2, A3, and B3, and the ON time of each of IGBTs Q1 to Q6 is adjusted, whereby three phase AC voltages applied to input nodes 6a to 6c can be converted to DC voltage E (terminal-to-terminal voltages of capacitors Cp and Cn).

Inverter 2 includes IGBTs Q11 to Q14 and diodes D11 to D16. The IGBTs configure switching elements. The collectors of IGBTs Q11 to Q13 are connected together to DC positive bus Lp and the emitters thereof are connected to input nodes 2a, 2b, and 2c, respectively. Output nodes 2a, 2b, and 2c are each connected to one terminal of the corresponding one of reactors L4 to L6 (FIG. 1). The collectors of IGBTs Q14 to Q16 are connected to output nodes 2a, 2b, and 2c, respectively, and the emitters thereof are connected together to DC negative bus Ln. Diodes D11 to D16 are connected in anti-parallel with IGBTs Q11 to Q16, respectively.

IGBTs Q11 and Q14 are controlled by gate signals X1 and Y1, respectively, IGBTs Q12 and Q15 are controlled by gate signals X2 and Y2, respectively, and IGBTs Q13 and Q16 are controlled by gate signals X3 and Y3, respectively. Gate signals Y1, Y2, and Y3 are inversion signals of gate signals X1, X2, and X3, respectively.

IGBTs Q11 to Q13 turn on when gate signals X1, X2, and X3 are brought to "H" level, respectively, and turn off when gate signals X1, X2, and X3 are brought to "L" level, respectively. IGBTs Q14 to Q16 turn on when gate signals Y1, Y2, and Y3 are brought to "H" level, respectively, and turn off when gate signals Y1, Y2, and Y3 are brought to "L" level, respectively.

Each of gate signals X1, Y1, X2, Y2, X3, and Y3 is a pulse signal train and a PWM signal. The phase of gate signal X1, Y1, the phase of gate signal X2, Y2, and the phase of gate signal X3, Y3 are basically shifted from each other by 120 degrees. Gate signals X1, Y1, Y2, Y2, X3, and Y3 are generated by control device 4.

For example, when IGBTs Q11 and Q15 turn on, DC positive bus Lp is connected to output node 2a through IGBT Q11, output node 2b is connected to DC negative bus Ln through IGBT Q15, and positive voltage is output between output nodes 2a and 2b.

When IGBTs Q12 and Q14 turn on, DC positive bus Lp is connected to output node 2b through IGBT Q12, output node 2a is connected to DC negative bus Ln through IGBT Q14, and negative voltage is output between output nodes 2a and 2b.

Each of IGBTs Q11 to Q16 is turned on and off at a predetermined timing by gate signals X1, Y1, X2, Y2, X3, and Y3, and the ON time of each of IGBTs Q11 to Q16 is adjusted, whereby DC voltage E between buses Lp and Ln can be converted to three phase AC voltages V4 to V6.

Figure 5:
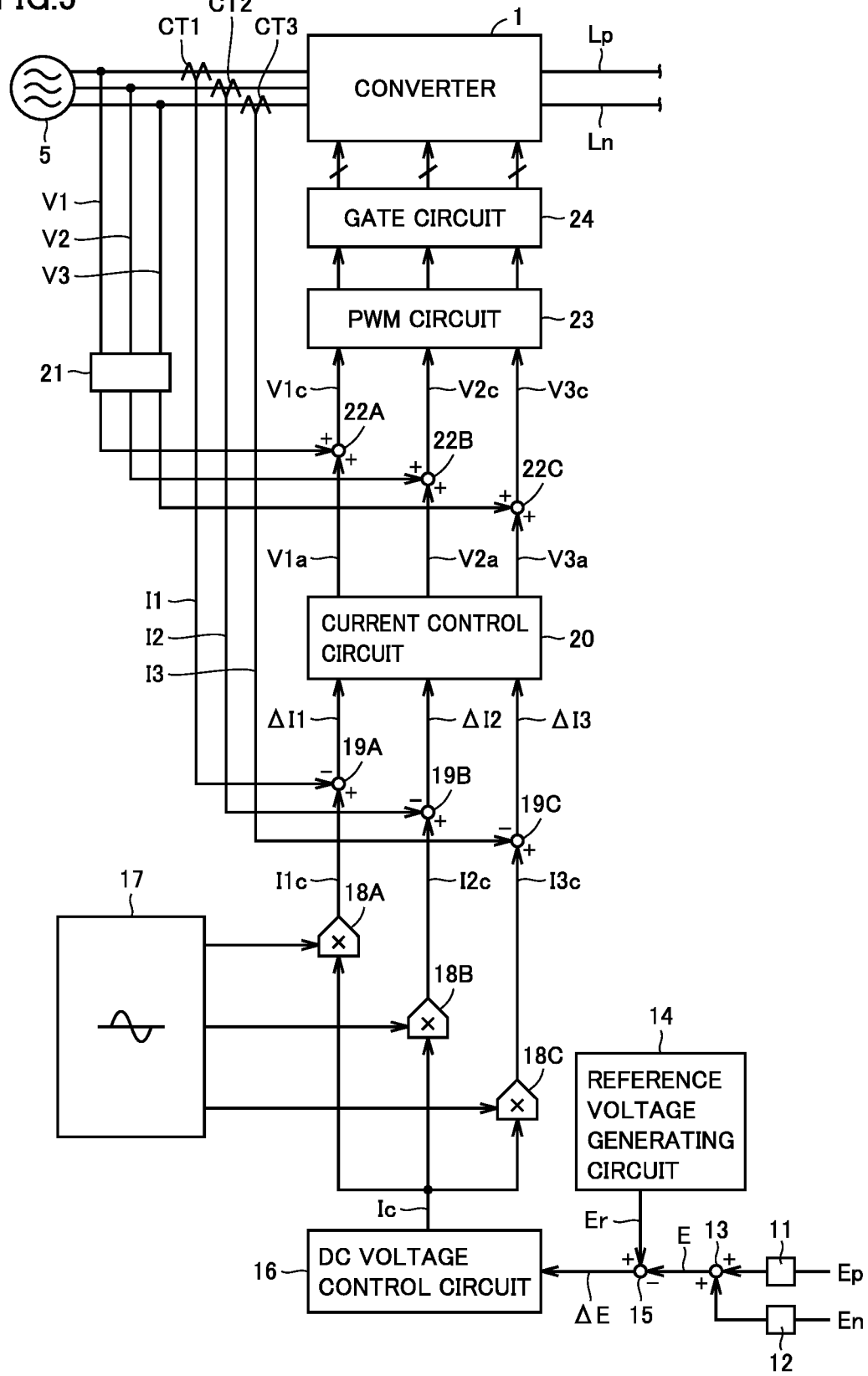
FIG. 5 is a circuit block diagram showing a configuration of a portion related to control of the converter in a control device shown in FIG. 1.

FIG. 5 is a circuit block diagram showing a portion related to control of converter 1 in control device 4 (FIG. 1). In FIG. 5, control device 4 includes voltage detectors 11 and 12, adders 13 and 22A to 22C, subtracters 15 and 19A to 19C, a reference voltage generating circuit 14, a DC voltage control circuit 16, a sine wave generating circuit 17, multipliers 18A to 18C, a current control circuit 20, a PWM circuit 23, and a gate circuit 24.

Voltage detector 11 detects terminal-to-terminal voltage Ep of capacitor Cp (FIG. 1) and outputs a signal indicating the detected value. Voltage detector 12 detects terminal-to-terminal voltage En of capacitor Cn (FIG. 1) and outputs a signal indicating the detected value. Adder 13 adds the output voltages of voltage detectors 11 and 12 and outputs a signal indicating the sum voltage E=Ep+En of terminal-to-terminal voltages of capacitors Cp and Cn.

Reference voltage generating circuit 14 outputs a signal indicating reference DC voltage Er that is a target value of DC voltage E. Subtracter 15 subtracts the output signal of adder 13 from the output signal of reference voltage generating circuit 14 and outputs a signal indicating a deviation ΔE=Er−E between reference DC voltage Er and DC voltage E.

DC voltage control circuit 16 calculates current command value Ic for controlling AC input currents I1 to I3 of converter 1 such that deviation ΔE=Er−E is zero. DC voltage control circuit 16 calculates current command value Ic, for example, by performing proportional operation or proportional integral operation of deviation ΔE=Er−E.

Sine wave generating circuit 17 generates three phase sine wave signals having the same phase as three phase AC voltages V1 to V3 from commercial AC power supply 5. Multipliers 18A to 18C multiply the three phase sine wave signals by current command value Ic to generate three phase current command values I1c to I3c, respectively.

Subtracter 19A calculates deviation ΔI1=I1c−I1 between current command value I1c and AC current I1 detected by current detector CT1. Subtracter 19B calculates deviation ΔI2=I2c−I2 between current command value I2c and AC current I2 detected by current detector CT2. Subtracter 19C calculates deviation ΔI3=I3c−I3 between current command value I3c and AC current I3 detected by current detector CT3.

Current control circuit 20 generates voltage command values V1a, V2a, and V3a such that each of deviations ΔI1, ΔI2, and ΔI3 becomes zero. Current control circuit 20 generates voltage command values V1a, V2a, and V3a, for example, by amplifying deviations ΔI1, ΔI2, and ΔI3 in accordance with proportional control or proportional integral control. Voltage detector 21 detects instantaneous values of three phase AC voltages V1 to V3 from commercial AC power supply 5 and outputs signals indicating the detected values.

Adder 22A adds voltage command value V1a to AC voltage V1 detected by voltage detector 21 to generate voltage command value V1c. Adder 22B adds voltage command value V2a to AC voltage V2 detected by voltage detector 21 to generate voltage command value V2c. Adder 22C adds voltage command value V3a to AC voltage V3 detected by voltage detector 21 to generate voltage command value V3c.

PWM circuit 23 generates PWM control signals φ1 to φ3 for controlling converter 1, based on voltage command values V1c to V3c. Gate circuit 24 generates gate signals A1, B1, A2, B2, A2, and B2 (FIG. 4) based on PWM control signals φ1 to φ3.

Figure 6:
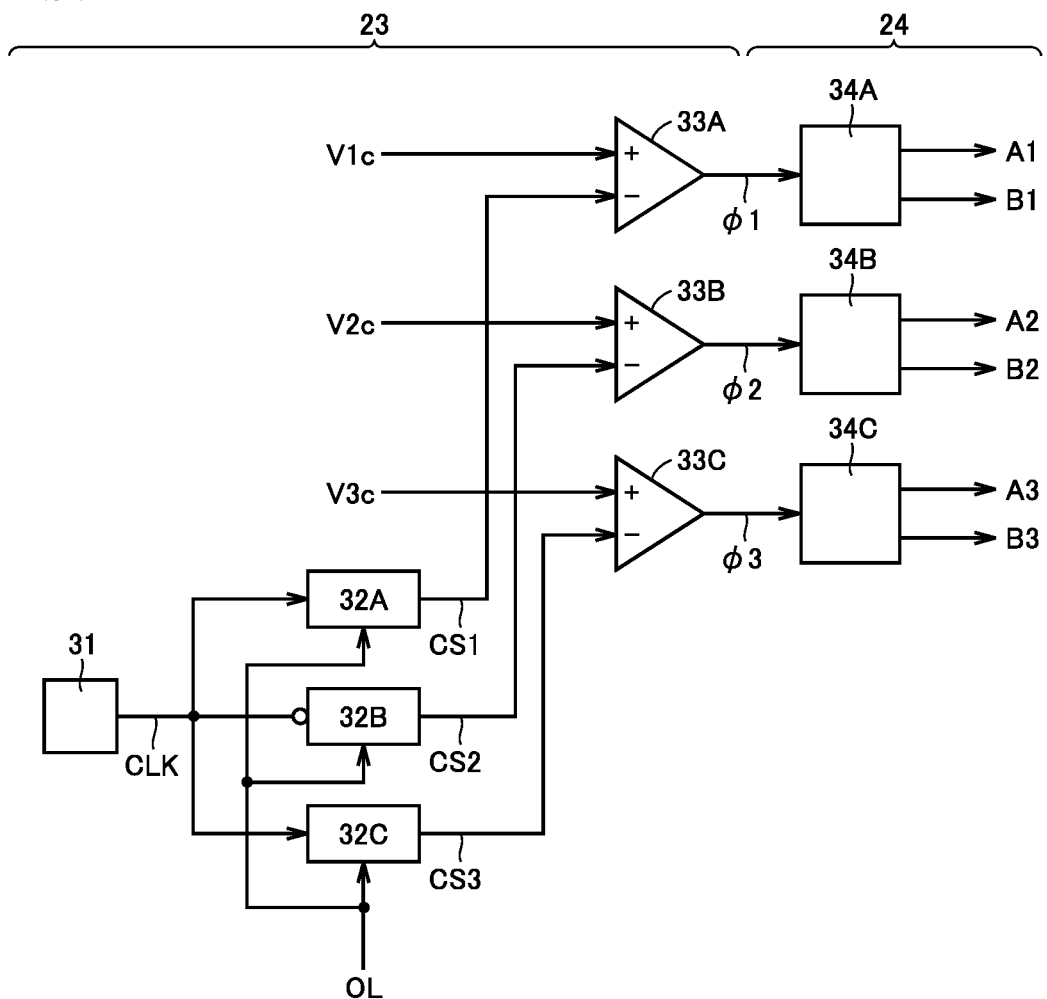
FIG. 6 is a block diagram showing a configuration of a PWM circuit and a gate circuit shown in FIG. 5.

FIG. 6 is a block diagram showing a configuration of PWM circuit 23 and gate circuit 24. In FIG. 6, PWM circuit 23 includes an oscillator 31, carrier wave signal generating circuits 32A to 32C, and comparators 33A to 33C. Oscillator 31 generates a clock signal CLK having a constant frequency (for example, 1 kHz to 10 kHz) sufficiently higher than a commercial frequency (for example, 60 Hz). Carrier wave signal generating circuits 32A to 32C are controlled by overlap signal OL and generate carrier wave signals CS1 to CS3, respectively, in synchronization with clock signal CLK.

More specifically, carrier wave signal generating circuit 32A converts clock signal CLK to triangular wave signal TS and outputs the triangular wave signal TS as carrier wave signal CS1 when overlap signal OL is "L" level. Carrier wave signal generating circuit 32A converts an inversion signal /CLK of clock signal CLK to triangular wave signal /TS and outputs the triangular wave signal /TS as carrier wave signal CS1 when overlap signal OL is "H" level. Triangular wave signal /TS is an inversion signal of triangular wave signal TS. Triangular wave signal TS and triangular wave signal /TS are therefore out of phase by 180 degrees.

Carrier wave signal generating circuit 32B converts inversion signal /CLK of clock signal CLK to triangular wave signal /TS and outputs the triangular wave signal /TS as carrier wave signal CS2 when overlap signal OL is "L" level. Carrier wave signal generating circuit 32B converts clock signal CLK to triangular wave signal TS and outputs the triangular wave signal TS as carrier wave signal CS2 when overlap signal OL is "H" level. Carrier wave signal CS1 and carrier wave signal CS2 are therefore out of phase by 180 degrees.

Similar to carrier wave signal generating circuit 32A, carrier wave signal generating circuit 32C converts clock signal CLK to triangular wave signal TS and outputs the triangular wave signal TS as carrier wave signal CS3 when overlap signal OL is "L" level, and carrier wave signal generating circuit 32C converts inversion signal /CLK of clock signal CLK to triangular wave signal /TS and outputs the triangular wave signal /TS as carrier wave signal CS3 when overlap signal OL is "H" level. Therefore, carrier wave signal CS1 and carrier wave signal CS3 have the same phase, and carrier wave signal CS1 and carrier wave signal CS2 are out of phase by 180 degrees. The reason why the phase difference of carrier wave signals CS1 to CS3 is set as described above will be described later.

Comparator 33A compares the levels of voltage command value V1c and carrier wave signal CS1 and generates PWM control signal φ1 indicating the comparison result. When V1c>CS1, PWM control signal φ1 goes to "H" level, and when V1c<CS1, PWM signal φ1 goes to "L" level.

Comparator 33B compares the levels of voltage command value V2c and carrier wave signal CS2 and generates PWM control signal φ2 indicating the comparison result. When V2c>CS2, PWM control signal φ2 goes to "H" level, and when V2c<CS2, PWM control signal φ2 goes to "L" level.

Comparator 33C compares the levels of voltage command value V3c and carrier wave signal CS3 and generates PWM control signal φ3 indicating the comparison result. When V3c>CS3, PWM control signal φ3 goes to "H" level, and when V3c<CS3, PWM control signal φ3 goes to "L" level.

Gate circuit 24 includes gate signal generating circuits 34A to 34C. Gate signal generating circuit 34A generates gate signal A1, which is a rectangular wave signal having the same phase as PWM control signal φ1, and gate signal B1, which is an inversion signal of gate signal A1. Gate signal generating circuit 34B generates gate signal A2, which is a rectangular wave signal having the same phase as PWM control signal φ2, and gate signal B2, which is an inversion signal of gate signal A2. Gate signal generating circuit 34C generates gate signal A3, which is a rectangular wave signal having the same phase as PWM control signal φ3, and gate signal B3, which is an inversion signal of gate signal A3.

Figure 7:
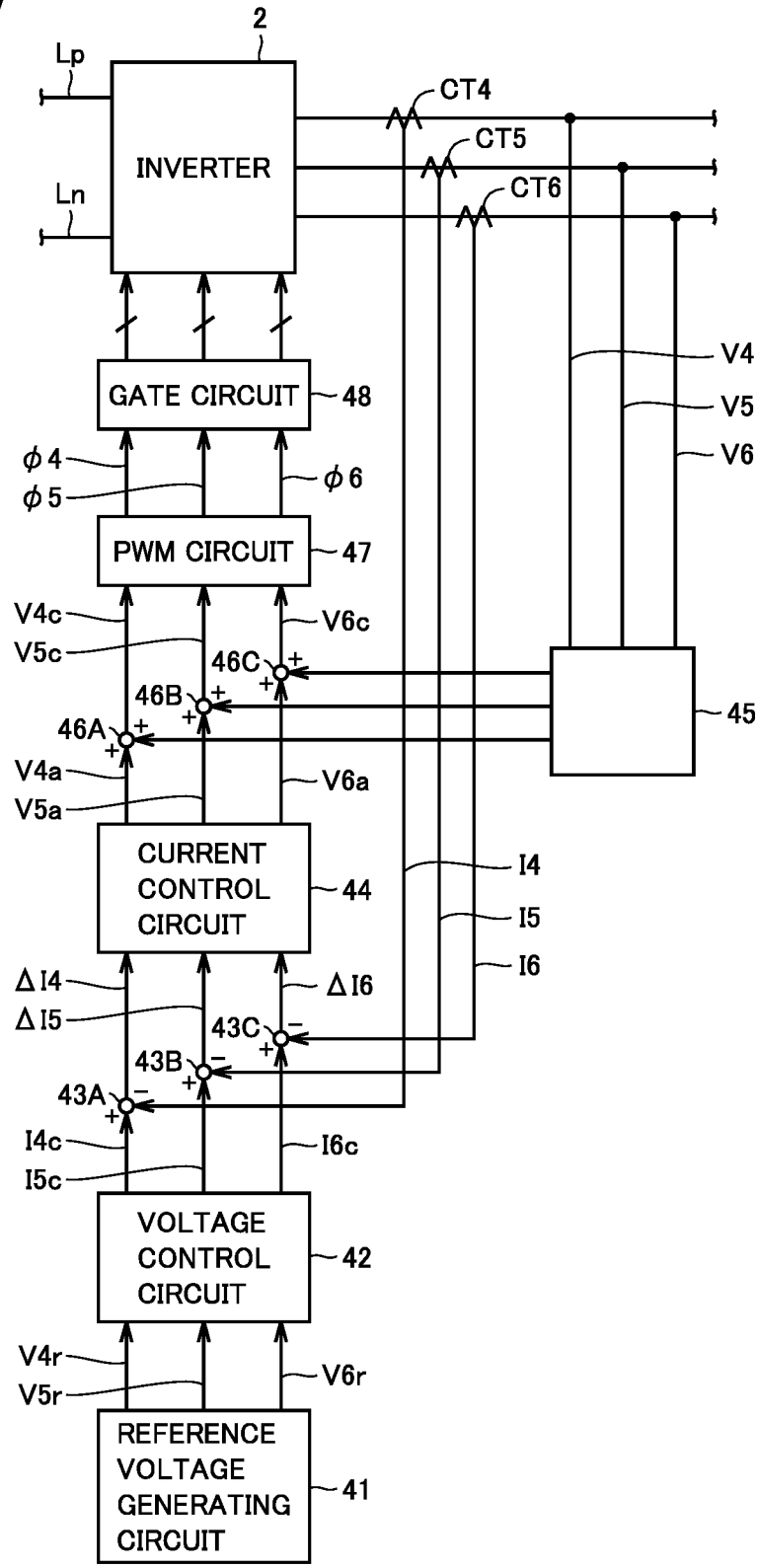
FIG. 7 is a circuit block diagram showing a configuration of a portion related to control of the inverter in the control device shown in FIG. 1.

FIG. 7 is a circuit block diagram showing a portion related to control of inverter 2 in control device 4 (FIG. 1). In FIG. 7, control device 4 includes a reference voltage generating circuit 41, a voltage control circuit 42, subtracters 43A to 43C, a current control circuit 44, a voltage detector 45, adders 46A to 46C, a PWM circuit 47, and a gate circuit 48.

Reference voltage generating circuit 41 generates three phase reference AC voltages V4r, V5r, and V6r. Each of reference AC voltages V4r, V5r, and V6r is a sine wave signal having a commercial frequency. Voltage control circuit 42 generates three phase current command values I4c, I5c, and I6c based on reference AC voltages V1r, V2r, and V3r from reference voltage generating circuit 41.

Subtracter 43A calculates a deviation ΔI4=I4c−I4 between current command value I4c and AC current I4 detected by current detector CT4. Subtracter 43B calculates a deviation ΔI5=I5c−I5 between current command value I5c and AC current I5 detected by current detector CT5. Subtracter 43C calculates a deviation ΔI6=I6c−I6 between current command value I6c and AC current I6 detected by current detector CT6.

Current control circuit 44 generates voltage command values V4a, V5a, and V6a such that each of deviations ΔI4, ΔI5, and ΔI6 becomes zero. Current control circuit 44 generates voltage command values V4a, V5a, and V6a, for example, by amplifying deviations ΔI4, ΔI5, and ΔI6 in accordance with proportional control or proportional integral control. Voltage detector 45 detects instantaneous values of three phase AC voltages V4 to V6 from inverter 2 and outputs signals indicating the detected values.

Adder 46A adds voltage command value V4a to AC voltage V4 detected by voltage detector 45 to generate voltage command value V4c. Adder 46B adds voltage command value V5a to AC voltage V5 detected by voltage detector 45 to generate voltage command value V5c. Adder 46C adds voltage command value V6a to AC voltage V6 detected by voltage detector 45 to generate voltage command value V6c. PWM circuit 47 generates PWM control signals φ4 to φ6 for controlling inverter 2, based on voltage command values V4c to V6c. Gate circuit 48 generates gate signals X1, Y1, X2, Y2, X2, and Y2 (FIG. 4) based on PWM control signals φ4 to φ6.

Figure 8:
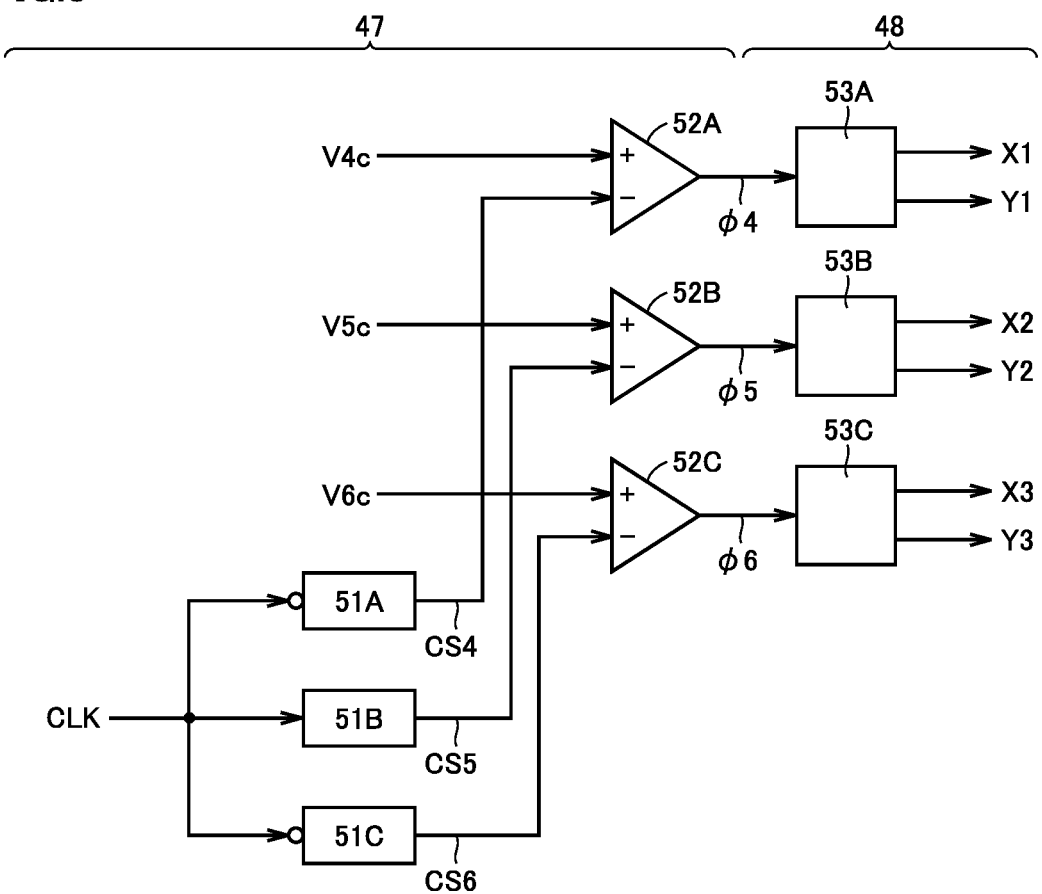
FIG. 8 is a block diagram showing a configuration of a PWM circuit and a gate circuit shown in FIG. 7.

FIG. 8 is a block diagram showing a configuration of PWM circuit 47 and gate circuit 48. In FIG. 8, PWM circuit 47 includes carrier wave signal generating circuits 51A to 51C and comparators 52A to 52C. Carrier wave signal generating circuits 51A to 51C generate carrier wave signals CS4 to CS6, respectively, in synchronization with clock signal CLK from oscillator 31 (FIG. 6).

More specifically, carrier wave signal generating circuit 51A converts inversion signal /CLK of clock signal CLK to triangular wave signal /TS and outputs the triangular wave signal /TS as carrier wave signal CS4. Carrier wave signal generating circuit 51B converts clock signal CLK to triangular wave signal TS and outputs the triangular wave signal TS as carrier wave signal CS5. Carrier wave signal generating circuit 51C converts inversion signal /CLK of clock signal CLK to triangular wave signal /TS and outputs the triangular wave signal /TS as carrier wave signal CS6. Therefore, carrier wave signal CS4 and carrier wave signal CS6 have the same phase, and carrier wave signal CS4 and carrier wave signal CS5 are out of phase by 180 degrees. The reason why the phase difference of carrier wave signals CS1 to CS3 is set as described above will be described later.

Comparator 52A compares the levels of voltage command value V4c and carrier wave signal CS4 and generates PWM control signal φ4 indicating the comparison result. When V4c>CS4, PWM control signal φ4 goes to "H" level, and when V4c<CS4, PWM control signal φ4 goes to "L" level.

Comparator 52B compares the levels of voltage command value V5c and carrier wave signal CS5 and generates PWM control signal φ5 indicating the comparison result. When V5c>CS5, PWM control signal φ5 goes to "H" level, and when V5c<CS5, PWM control signal φ5 goes to "L" level.

Comparator 52C compares the levels of voltage command value V6c and carrier wave signal CS6 and generates PWM control signal φ6 indicating the comparison result. When V6c>CS6, PWM control signal φ6 goes to "H" level, and when V6c<CS6, PWM control signal φ6 goes to "L" level.

Gate circuit 48 includes gate signal generating circuits 53A to 53C. Gate signal generating circuit 53A generates gate signal X1, which is a rectangular wave signal having the same phase as PWM control signal φ4, and gate signal Y1, which is an inversion signal of gate signal X1. Gate signal generating circuit 53B generates gate signal X2, which is a rectangular wave signal having the same phase as PWM control signal φ5, and gate signal Y2, which is an inversion signal of gate signal X2. Gate signal generating circuit 53C generates gate signal X3, which is a rectangular wave signal having the same phase as PWM control signal φ6, and gate signal Y3, which is an inversion signal of gate signal X3.

Figure 9:
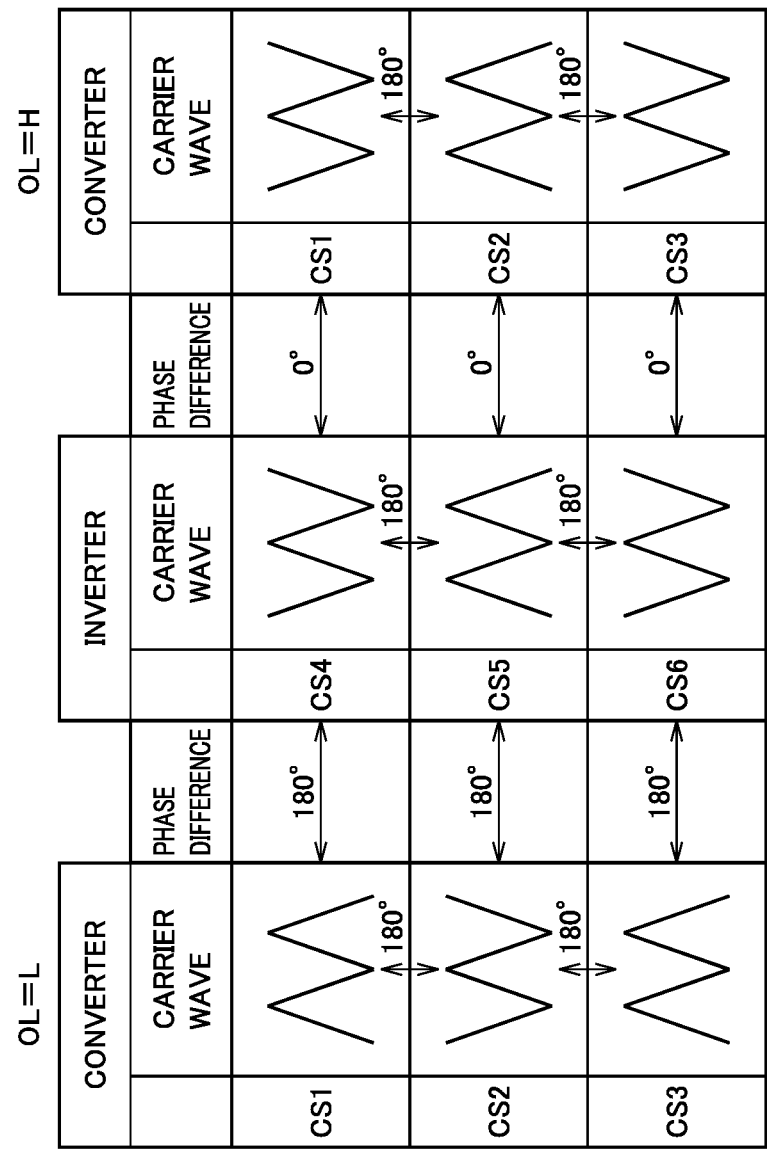
FIG. 9 is a diagram showing a phase difference of carrier wave signals CS1 to CS6 shown in FIG. 6 and FIG. 8.

FIG. 9 is a diagram showing the phase difference of carrier wave signals CS1 to CS6. In FIG. 9, when overlap signal OL is "L" level (OL=L), carrier wave signals CS1 to CS3 for converter 1 are triangular wave signals TS, /TS, and TS, respectively, and when overlap signal OL is "H" level (OL=H), carrier wave signals CS1 to CS3 for converter 1 are triangular wave signals /TS, TS, and /TS, respectively. Carrier wave signals CS4 to CS6 for inverter 2 are triangular wave signals /TS, TS, and /TS, respectively, irrespective of overlap signal OL.

In either case of OL=L and OL=H, carrier wave signals CS1 and CS3 have the same phase, and carrier wave signals CS1 and CS2 are out of phase by 180 degrees. That is, of carrier wave signals CS1 to CS3 for converter 1, one carrier wave signal has the same phase as the phase of another carrier wave signal and is out of phase by 180 degrees from the other carrier wave signal. This is to reduce zero-phase current generated in converter 1 and reduce a zero-phase harmonic component.

Carrier wave signals CS4 and CS6 have the same phase, and carrier wave signals CS4 and CS5 are out of phase by 180 degrees. That is, of carrier wave signals CS4 to CS6 for inverter 2, one carrier wave signal has the same phase as the phase of another carrier wave signal and is out of phase by 180 degrees from the other carrier wave signal. This is to reduce zero-phase current generated in inverter 2 and reduce a zero-phase harmonic component.

Furthermore, when overlap signal OL is "L" level, carrier wave signals CS1 to CS3 for converter 1 are out of phase by 180 degrees with carrier wave signals CS4 to CS6 for inverter 2, respectively. This is to reverse the polarity of first zero-phase current flowing from converter 1 to the intermediate node of capacitors Cp and Cn through reactors L1 to L3, capacitors C1 to C3, and ground line Lg and the polarity of second zero-phase current flowing from inverter 2 to the intermediate node of capacitors Cp and Cn through reactors L4 to L6, capacitors C4 to C6, and ground line Lg from each other and to cancel the first and second zero-phase currents (see FIG. 14). This can further reduce a zero-phase harmonic component.

Figure 18:
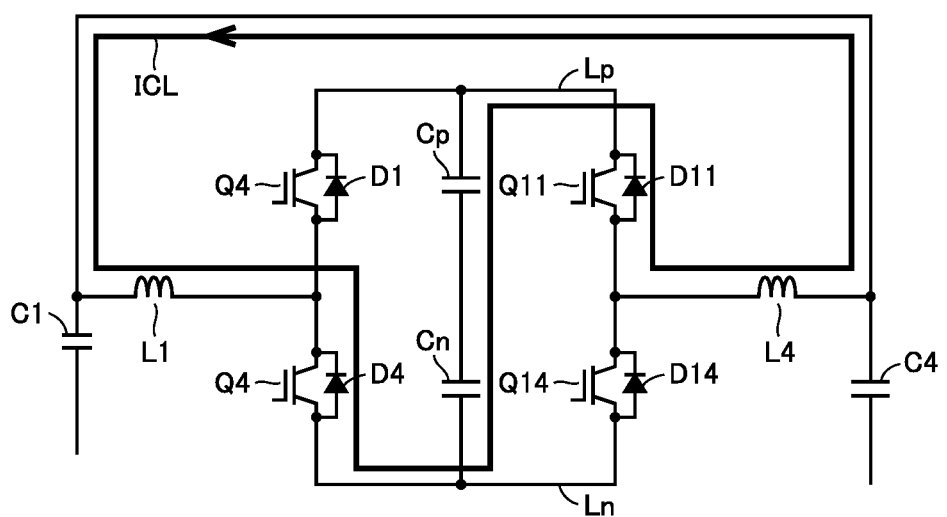
FIG. 18 is a circuit diagram for explaining a problem in Comparative Example 3.

However, if the phases of carrier wave signals CS1 to CS3 for converter 1 and the phases of carrier wave signals CS4 to CS6 for inverter 2 are shifted by 180 degrees, respectively, even in the overlap power feed mode in which switches S1 to S6 are turned on, circulating current flows through the path of inverter 2, reactors L4 to L6, switches S1 to S3, switches S4 to S6, reactors L1 to L3, converter 1, and capacitors Cn and Cp (see FIG. 18). Then, in the present embodiment, when OL=H, carrier wave signals CS1 to CS3 for converter 1 are matched in phase with carrier wave signals CS4 to CS6 for inverter 2. This can reduce circulating current in the overlap power feed mode.

Comparative Example 1

In this Comparative Example 1, all of carrier wave signals CS1 to CS6 are matched in waveform and phase. Here, six carrier wave signals CS1 to CS6 matched in waveform and phase are collectively referred to as carrier wave signal CS0.

Figure 10:
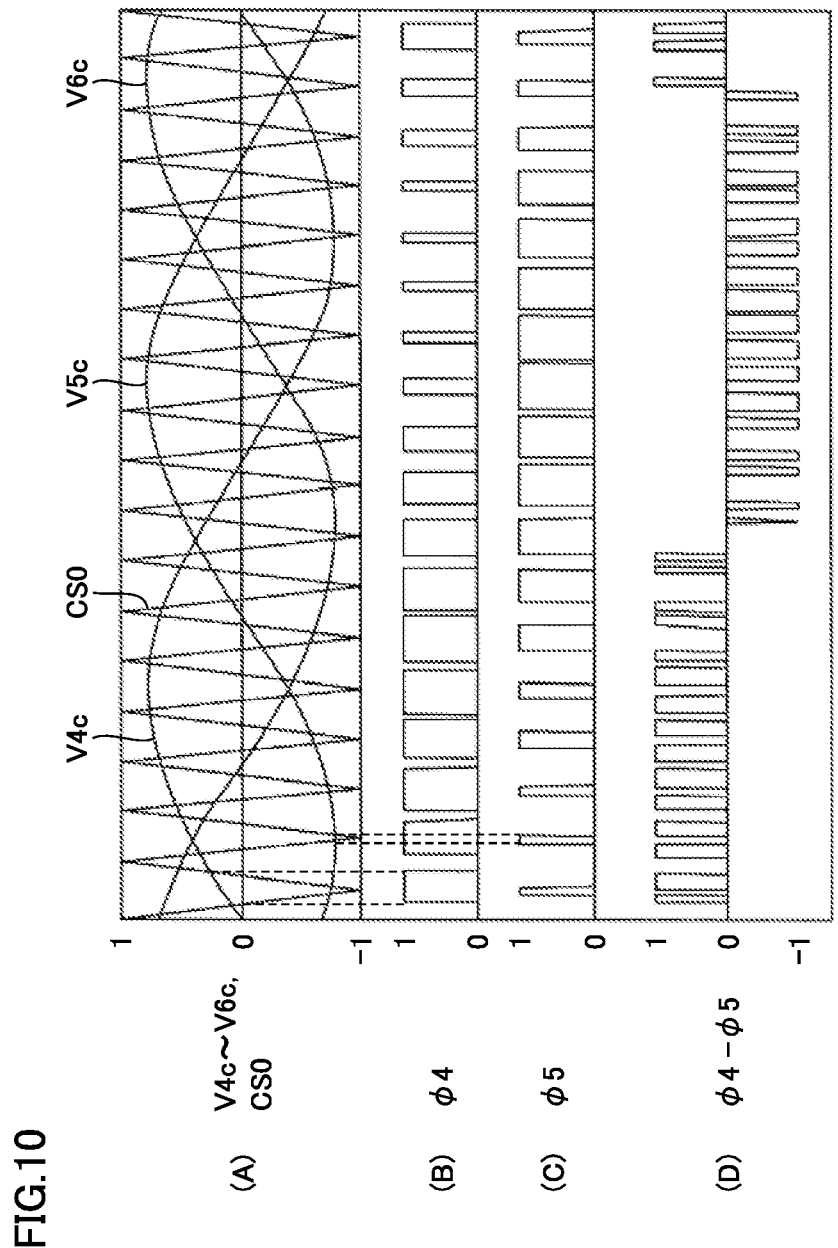
FIG. 10 is a waveform diagram showing a control method of inverter 2 according to Comparative Example 1 of the embodiment.

FIGS. 10(A) to 10(D) are waveform diagrams showing a control method of inverter 2 according to Comparative Example 1 of the embodiment. Specifically, FIG. 10(A) shows voltage command values V4c to V6c and carrier wave signal CS0, FIGS. 10(B) and 10(C) show PWM control signals φ4 and φ5, respectively, and FIG. 10(D) shows the difference between PWM control signals φ4 and φ5 (φ4-φ5). Each of voltage command values V4c to V6c is a sine wave signal having a commercial frequency (for example, 50 Hz or 60 Hz). The phases of voltage command values V4c to V6c are shifted from each other by 120 degrees. Carrier wave signal CS0 is a triangular wave signal having a frequency (for example, 1 kHz to 10 kHz) sufficiently higher than a commercial frequency.

The value of carrier wave signal CS0 is compared with each of voltage command values V4c to V6c, and PWM control signals φ4 to φ6 are generated (see FIG. 8). Each of PWM control signals φ4 to φ6 is a rectangular wave signal synchronized with carrier wave signal CS0. In the period in which the voltage command value is larger than the value of carrier wave signal CS0, the rectangular wave signal is "H" level (=1). In the period in which the voltage command value is smaller than the value of carrier wave signal CS0, the rectangular wave signal is "L" level (=0).

The level of gate signal X1 (FIG. 8) changes in accordance with the level change of PWM control signal φ4, and the level of voltage of output node 2a (FIG. 4) of inverter 2 changes in accordance with the level change of gate signal X1. The level of gate signal X2 (FIG. 8) changes in accordance with the level change of PWM control signal φ5, and the level of voltage of output node 2b (FIG. 4) of inverter 2 changes in accordance with the level change of gate signal X2. The level of gate signal X3 (FIG. 8) changes in accordance with the level change of PWM control signal φ6, and the level of voltage of output node 2c (FIG. 4) of inverter 2 changes in accordance with the level change of gate signal X3.

For example, the waveform of voltage appearing between output nodes 2a and 2b of inverter 2 in response to PWM control signals φ4 and φ5 is the same as the waveform of difference between PWM control signals φ4 and φ5 (φ4-φ5), as shown in FIGS. 10(B) to 10(D).

Figure 12:
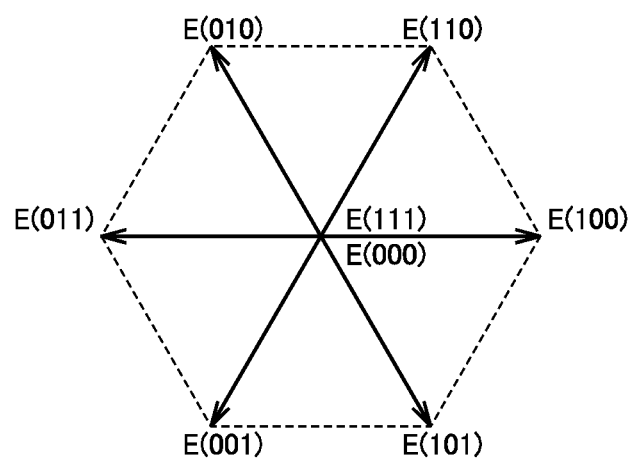
FIG. 12 is a diagram for explaining the voltage vectors.

FIG. 11 is a diagram for explaining the correspondence between the combinations of values of gate signals X1 to X3 and voltage vectors. FIG. 12 is a diagram for explaining the voltage vectors. In FIG. 11 and FIG. 12, when gate signals X1 to X3 (FIG. 4) are "1" (="H" level), IGBTs Q11, Q12, and Q13 on the positive side (FIG. 4) turn on, respectively, and IGBTs Q14, Q15, and Q16 on the negative side turn off, respectively.

When gate signals X1 to X3 (FIG. 4) are "0" (="L" level), IGBTs Q11, Q12, and Q13 on the positive side turn off, respectively, and IGBTs Q14, Q15, and Q16 on the negative side turn on, respectively. E(111) is a voltage vector when all of gate signals X1 to X3 are "1". E(000) is a voltage vector when all of gate signals X1 to X3 are "0". The zero-phase component is the largest when the voltage vector is E(111) or E(000).

Figure 13:
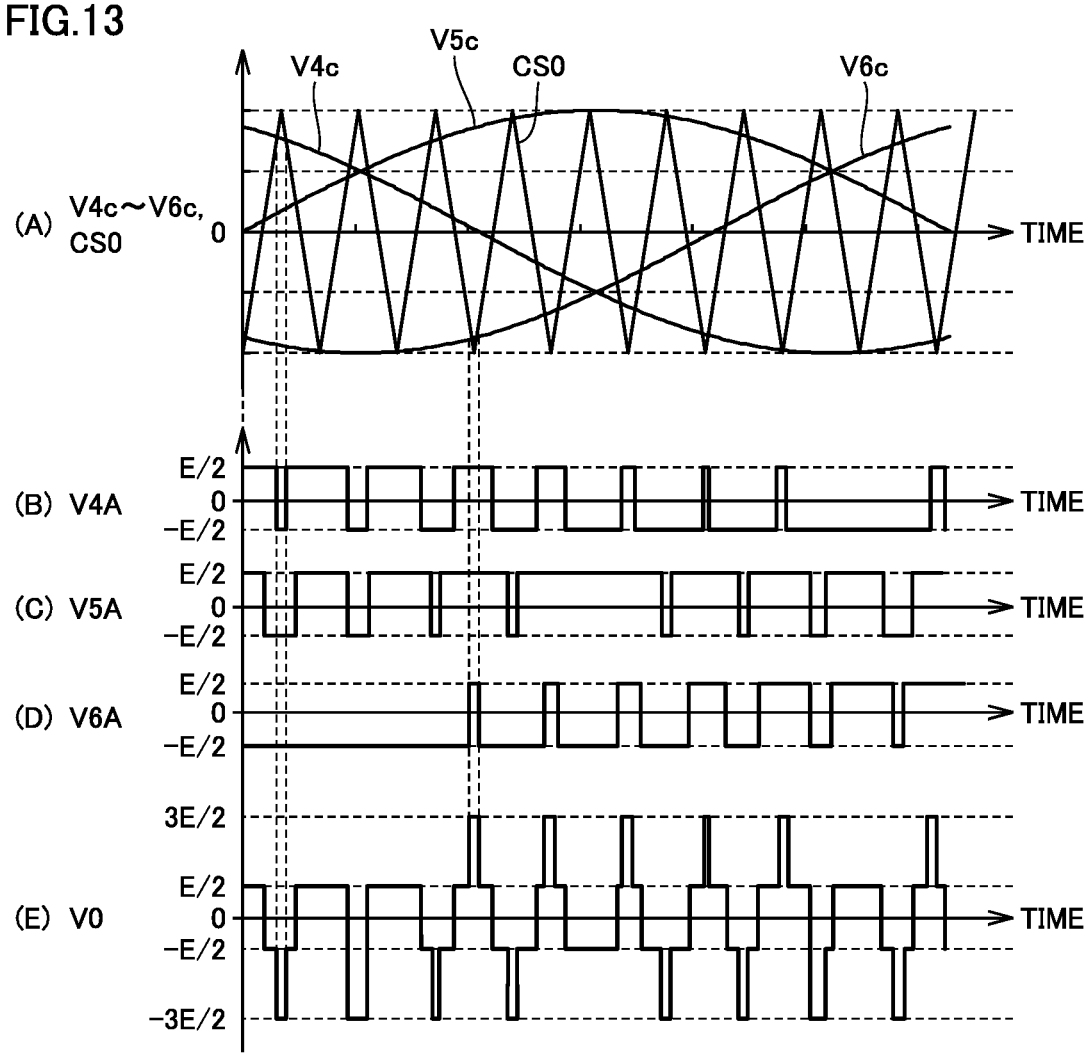
FIG. 13 is a waveform diagram for explaining a zero-phase voltage produced in inverter 2 in Comparative Example 1.

FIGS. 13(A) to 13(E) are waveform diagrams for explaining zero-phase voltage V0 produced in inverter 2 in Comparative Example 1. Specifically, FIG. 13(A) shows voltage command values V4c to V6c and carrier wave signal CS0, FIGS. 13(B) to 13(D) show voltages V4A to V6A appearing at output nodes 2a to 2c (FIG. 4) of inverter 2, and FIG. 13(E) shows zero-phase voltage V0. Zero-phase voltage V0 is the sum of voltages V4A to V6A.

When voltage command value V4c is higher than the value of carrier wave signal CS0, gate signal X1 is "1", and V4A=E/2. When voltage command value V4c is lower than the value of carrier wave signal CS0, gate signal X1 is "0", and V4A=−E/2.

When voltage command value V5c is higher than the value of carrier wave signal CS0, gate signal X2 is "1", and V5A=E/2. When voltage command value V5c is lower than the value of carrier wave signal CS0, gate signal X2 is "0", and V5A=−E/2.

When voltage command value V6c is higher than the value of carrier wave signal CS0, gate signal X3 is "1", and V6A=E/2. When voltage command value V6c is lower than the value of carrier wave signal CS0, gate signal X3 is "0", and V6A=−E/2.

When carrier wave signal CS0 is the highest value (positive peak value), all voltage command values V4c to V6c are lower than carrier wave signal CS0. The voltage vector at this time is E(000), all V4A to V6A are −E/2. Zero-phase voltage V0 is V4A+V5A+V6A. Therefore, when the voltage vector is E(000), V0=−3E/2.

When carrier wave signal CS0 is the lowest value (negative peak value), all voltage command values V4c to V6c are lower than carrier wave signal CS0. The voltage vector at this time is E(111), and all V4A to V6A are E/2. Zero-phase voltage V0 is V4A+V5A+V6A. Therefore, when voltage vector is E(111), V0=3E/2.

As shown in FIGS. 13(A) to 13(E), the absolute value of zero-phase voltage V0 is large when carrier wave signal CS0 reaches the peak value. In FIGS. 10(A) to 10(D) to FIGS. 13(A) to 13(E), zero-phase voltage V0 generated in inverter 2 has been described. However, the same phenomenon occurs also in converter 1.

Figure 14:
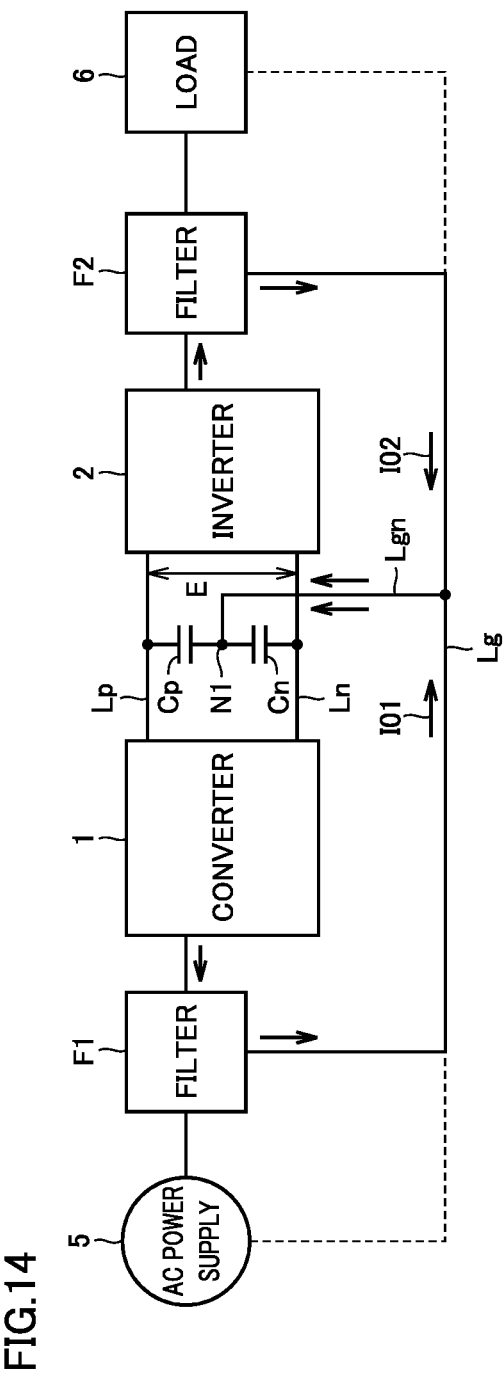
FIG. 14 is a circuit block diagram for explaining zero-phase current flowing through the uninterruptible power supply apparatus in Comparative Example 1.

FIG. 14 is a circuit block diagram showing zero-phase currents I01 and I02 flowing through the uninterruptible power supply apparatus shown in FIG. 1. In FIG. 14, filter F1 includes reactors L1 to L3 and capacitors C1 to C3 (FIG. 1), and filter F2 includes reactors L4 to L6 and capacitors C4 to C6 (FIG. 1). In the inverter power feed mode, it is assumed that converter 1 and inverter 2 are operated, zero-phase voltage is produced at input nodes 1a to 1c (FIG. 4) of converter 1, and zero-phase voltage is produced at output nodes 2a to 2c (FIG. 4) of inverter 2.

When zero-phase voltage is produced at input nodes 1a to 1c of converter 1, zero-phase current I01 flows through the path from input nodes 1a to 1c of converter 1 to neutral point N1 (the node between capacitors Cp and Cn) through filter F1, ground line Lg, and neutral line Lgn.

When zero-phase voltage is produced at output nodes 2a to 2c of inverter 2, zero-phase current I02 flows through the path from output nodes 2a to 2c of inverter 2 to neutral point N1 (the node between capacitors Cp and Cn) through filter F2, ground line Lg, and neutral line Lgn.

Therefore, in this Comparative Example 1, since zero-phase currents I01 and I02 are large, loss in filters F1 and F2 is large and common mode noise is large.

Comparative Example 2

Figure 15:
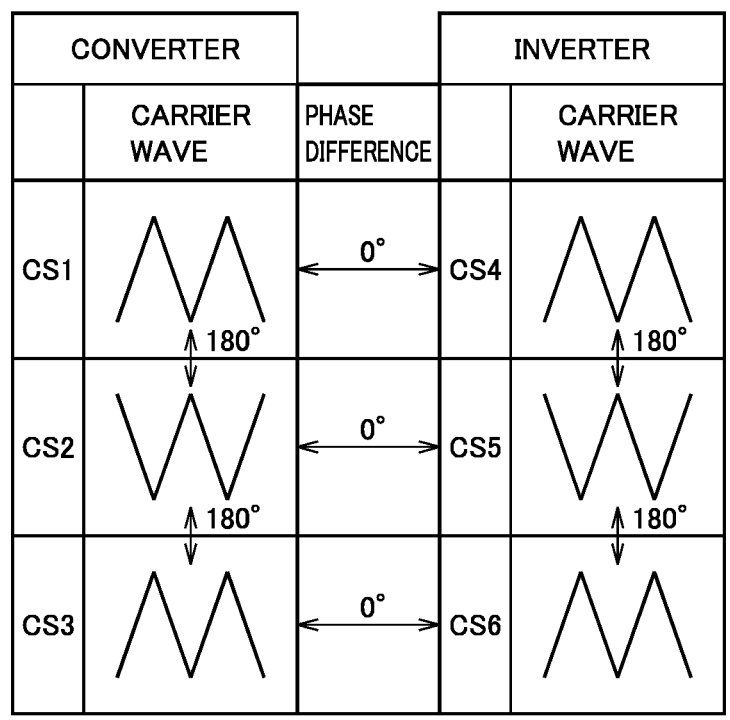
FIG. 15 is a diagram showing a phase difference of carrier wave signals CS1 to CS6 in Comparative Example 2 of the embodiment.

FIG. 15 is a diagram showing the phases of carrier wave signals CS1 to CS6 in Comparative Example 2 of the embodiment. In FIG. 15, in this Comparative Example 2, carrier wave signals CS1 and CS3 for converter 1 are in phase, and carrier wave signals CS1 and CS2 are out of phase by 180 degrees. Carrier wave signals CS4 and CS6 for inverter 2 are in phase, and carrier wave signals CS4 and CS5 are out of phase by 180 degrees. Further, carrier wave signals CS1 to CS3 are in phase with carrier wave signals C4 to C6, respectively.

Figure 16:
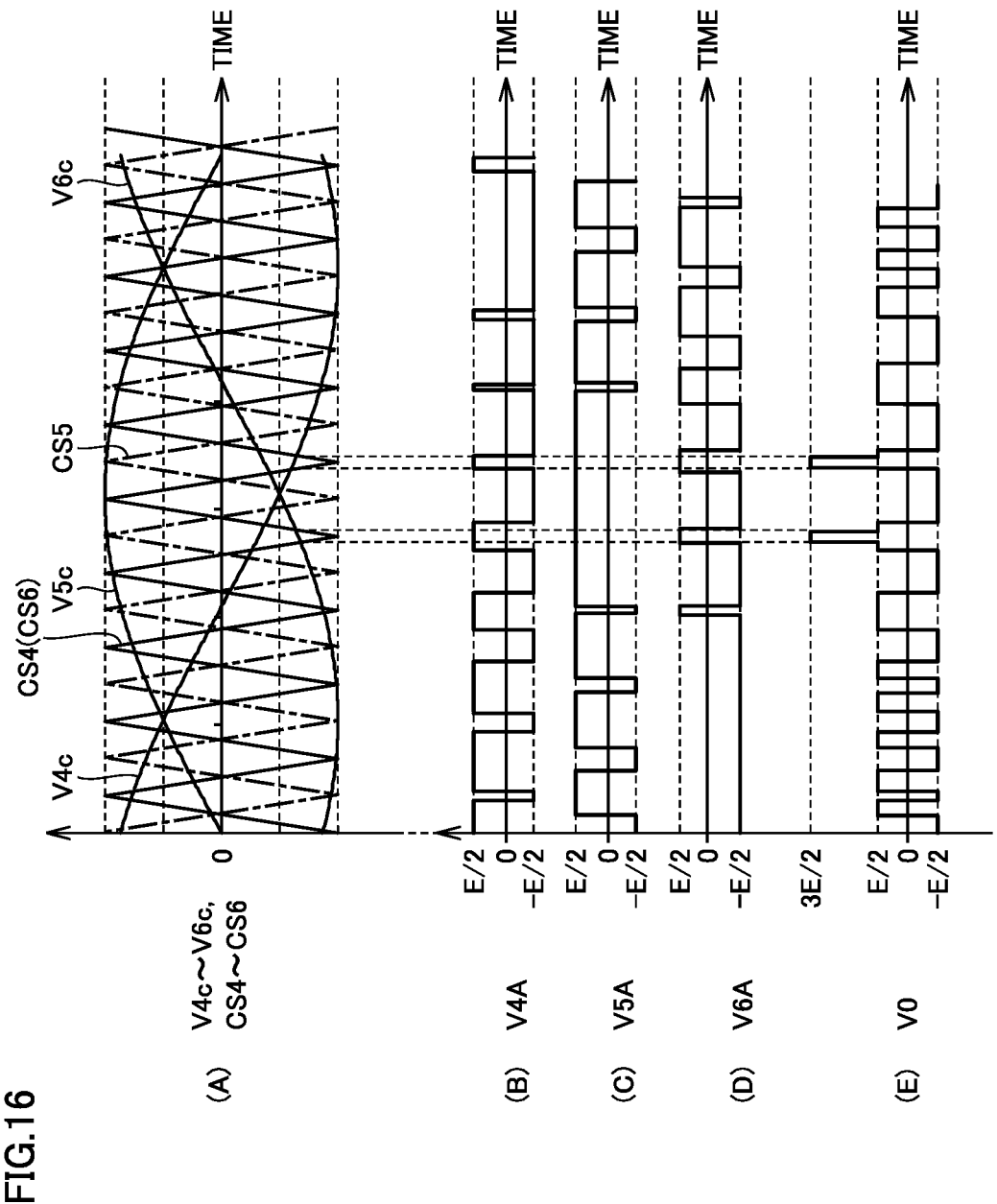
FIG. 16 is a waveform diagram showing a control method of inverter 2 according to Comparative Example 2.

FIGS. 16(A) to 16(E) are waveform diagrams for explaining zero-phase voltage V0 produced in inverter 2 in Comparative Example 2, in comparison with FIGS. 13(A) to 13(E). Specifically, FIG. 16(A) shows voltage command values V4c to V6c and carrier wave signals CS4 to CS6, FIGS. 16(B) to 16(D) show voltages V4A to V6A appearing at output nodes 2a to 2c of inverter 2 (FIG. 4), and FIG. 16(E) shows zero-phase voltage V0. Zero-phase voltage V0 is the sum of voltages V4A to V6A.

When FIGS. 13(A) to 13(E) and FIGS. 16(A) to 16(E) are compared, the phase of one carrier wave signal is inverted relative to the other two carrier wave signals, whereby the frequency of zero-phase voltage V0 reaching the positive peak value (+3E/2) is reduced. Further, the negative peak value of zero-phase voltage V0 changes from −3E/2 to −E/2. The time average of zero-phase voltage V0 is thus reduced. When zero-phase voltage V0 is small, zero-phase current is also small. In FIGS. 16(A) to 16(E), zero-phase voltage V0 produced in inverter 2 has been described. However, the same phenomenon occurs also in converter 1.

In this Comparative Example 2, therefore, compared with Comparative Example 1, zero-phase currents I01 and I02 can be reduced. Accordingly, loss in filters F1 and F2 can be reduced, and common mode noise can be reduced.

Comparative Example 3

Figure 17:
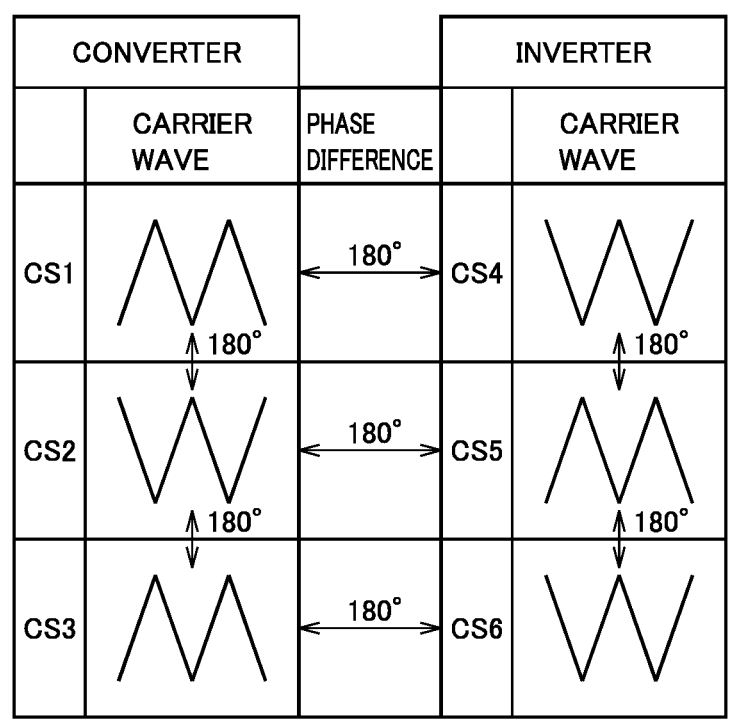
FIG. 17 is a diagram showing a phase difference of carrier wave signals CS1 to CS6 in Comparative Example 3 of the embodiment.

FIG. 17 is a diagram showing the phases of carrier wave signals CS1 to CS6 in Comparative Example 3 of the embodiment, in comparison with FIG. 15. In FIG. 17, in this Comparative Example 3, carrier wave signals CS1 and CS3 for converter 1 are in phase, and carrier wave signals CS1 and CS2 are out of phase by 180 degrees. Carrier wave signals CS4 and CS6 for inverter 2 are in phase, and carrier wave signals CS4 and CS5 are out of phase by 180 degrees. Further, carrier wave signals CS1 to CS3 are out of phase by 180 degrees with carrier wave signals C4 to C6, respectively.

In this Comparative Example 3, therefore, the polarity of zero-phase current I02 (FIG. 14) is the opposite polarity to zero-phase current I01 (FIG. 14), so that zero-phase currents I01 and I02 can be cancelled out. Accordingly, loss in filters F1 and F2 can be reduced, and common mode noise can be reduced.

FIG. 18 is a circuit diagram for explaining the problem in Comparative Example 3, in comparison with FIG. 1. In FIG. 18, only a circuit for one of three phases is shown. In the embodiment, switches S1 to S6 are turned on in the overlap power feed mode. In FIG. 18, switches S1 and S4 in the ON state are not illustrated.

In Comparative Example 3, the phase difference between carrier wave signals CS1 and CS4 is always set to 180 degrees. However, if the phase difference between carrier wave signals CS1 and CS4 is set to 180 degrees even in the overlap power feed mode, as shown in FIG. 18, IGBTs Q4 and Q11 simultaneously turn on, and a resonance phenomenon occurs in the path of DC positive bus Lp, IGBT Q11, reactor L4, switches S1 and S4 (not shown), reactor L1, IGBT Q4, DC negative bus Ln, and capacitors Cn and Cp, and circulating current ICL may flow through the path. The wiring of the path may generate heat due to circulating current ICL.

Then, in the present embodiment, in the overlap power feed mode (OL=H), carrier wave signals CS1 to CS3 for converter 1 are matched in phase with carrier wave signals CS4 to CS6 for inverter 2 (FIG. 9). This can reduce circulating current ICL in the overlap power feed mode.

As described above, in the present embodiment, in the inverter power feed mode and the bypass power feed mode, the respective phase differences between carrier wave signals CS1 to CS3 for converter 1 and carrier wave signals CS4 to CS6 for inverter 2 are set to 180 degrees, so that a zero-phase harmonic component produced from the uninterruptible power supply apparatus can be reduced. In the overlap power feed mode, carrier wave signals CS1 to CS3 are matched in phase with carrier wave signals CS4 to CS6, respectively, so that circulating current ICL can be reduced.

In the present embodiment, the invention of the subject application is applied to an uninterruptible power supply apparatus including converter 1 and inverter 2 in two levels. However, the invention of the subject application is applicable to an uninterruptible power supply apparatus including a converter and an inverter in multi-levels.

Embodiments disclosed here should be understood as being illustrative rather than being limitative in all respects. The present invention is shown not in the foregoing description but in the claims, and it is intended that all modifications that come within the meaning and range of equivalence to the claims are embraced here.

REFERENCE SIGNS LIST

C1 to C6, Cp, Cn capacitor, L1 to L6 reactor, CT1 to CT6 current detector, 1 converter, Lp DC positive bus, Ln DC negative bus, 2 inverter, 3 operation unit, 4 control device, 5 commercial AC power supply, 6 load, 7 battery, Q1 to Q6, Q11 to Q16 IGBT, D1 to D6, D11 to D16 diode, 11, 12, 21, 45 voltage detector, 13, 22A to 22C, 46A to 46C adder, 15, 19A to 19C, 43A to 43C subtracter, 14, 41 reference voltage generating circuit, 16 DC voltage control circuit, 17 sine wave generating circuit, 18A to 18C multiplier, 20, 44 current control circuit, 23, 47 PWM circuit, 24, 48 gate circuit, 31 oscillator, 32A to 32C, 51A to 51C carrier wave signal generating circuit, 33A to 33C, 52A to 52C comparator, 34A to 34C gate signal generating circuit, 42 voltage control circuit, F1, F2 filter.

The invention claimed is:
1. A power supply apparatus comprising:
a forward converter that converts first AC power supplied from a commercial AC power supply to DC power;
a reverse converter that converts DC power to second AC power having a commercial frequency;
a first switch connected between the reverse converter and a load;
a second switch connected between the commercial AC power supply and the load;

a first control unit that performs any one of power feed modes including
  a first power feed mode in which the first switch is turned on, the second switch is turned off, and the second AC power is supplied to the load,
  a second power feed mode in which the first and second switches are turned on and the first and second AC powers are supplied to the load, and
  a third power feed mode in which the first switch is turned off, the second switch is turned on, and the first AC power is supplied to the load; and
a second control unit that controls each of the forward converter and the reverse converter, wherein
the second control unit including
  a first voltage command unit that generates a first voltage command value corresponding to AC voltage input to the forward converter,
  a second voltage command unit that generates a second voltage command value corresponding to AC voltage output from the reverse converter,
  a signal generating unit that generates first and second carrier wave signals,
  a first comparison unit that compares the first voltage command value with the first carrier wave signal and generates a first control signal for controlling the forward converter based on a comparison result, and
  a second comparison unit that compares the second voltage command value with the second carrier wave signal and generates a second control signal for controlling the reverse converter based on a comparison result,
wherein the signal generating unit sets a phase difference between the first and second carrier wave signals to 180 degrees in the first and third power feed modes and matches phases of the first and second carrier wave signals in the second power feed mode.

2. The power supply apparatus according to claim 1, wherein
  each of the first and second voltage command values is a sine wave signal having a commercial frequency,
  each of the first and second carrier wave signals includes a triangular wave signal having a frequency higher than the commercial frequency, and
  each of the first and second control signals is a pulse width modulation control signal.

3. The power supply apparatus according to claim 1, wherein
  the first control unit
  performs the first power feed mode when the reverse converter is normal, and
  performs the third power feed mode after performing the second power feed mode for a predetermined period of time, when the reverse converter is failed.

4. A power supply apparatus comprising:
a forward converter that converts first three-phase AC power supplied from a commercial AC power supply to DC power;
a reverse converter that converts DC power to second three-phase AC power having a commercial frequency;
first to third switches connected between the reverse converter and a load;
fourth to sixth switches connected between the commercial AC power supply and the load;
a first control unit that performs any one of power feed modes including
  a first power feed mode in which the first to third switches are turned on, the fourth to sixth switches are turned off, and the second three-phase AC power is supplied to the load,
  a second power feed mode in which the first to sixth switches are turned on and the first and second three-phase AC powers are supplied to the load, and
  a third power feed mode in which the first to third switches are turned off, the fourth to sixth switches are turned on, and the first three-phase AC power is supplied to the load; and
a second control unit that controls each of the forward converter and the reverse converter,
the second control unit including
  a first voltage command unit that generates first to third voltage command values respectively corresponding to three phase AC voltages input to the forward converter,
  a second voltage command unit that generates fourth to sixth voltage command values respectively corresponding to three phase AC voltages output from the reverse converter,
  a signal generating unit that generates first to sixth carrier wave signals,
  a first comparison unit that compares the first to third voltage command values with the first to third carrier wave signals, respectively, and generates first to third control signals for controlling the forward converter based on a comparison result, and
  a second comparison unit that compares the fourth to sixth voltage command values with the fourth to sixth carrier wave signals, respectively, and generates fourth to sixth control signals for controlling the reverse converter based on a comparison result,
wherein the signal generating unit sets respective phase differences between the first to third carrier wave signals and the fourth to sixth carrier wave signals to 180 degrees in the first and third power feed modes and matches phases of the first to third carrier wave signals with phases of the fourth to sixth carrier wave signals, respectively, in the third power feed mode.

5. The power supply apparatus according to claim 4, wherein
  each of the first to sixth voltage command values is a sine wave signal having a commercial frequency,
  each of the first to sixth carrier wave signals includes a triangular wave signal having a frequency higher than the commercial frequency, and
  each of the first to sixth control signals is a pulse width modulation control signal.

6. The power supply apparatus according to claim 4, wherein
  the first control unit
  performs the first power feed mode when the reverse converter is normal, and
  performs the third power feed mode after performing the second power feed mode for a predetermined period of time, when the reverse converter is failed.

7. The power supply apparatus according to claim 4, wherein
  the first and second carrier wave signals have phases different from each other by 180 degrees,
  the first and third carrier wave signals have an identical phase,
  the fourth and fifth carrier wave signals have phases different from each other by 180 degrees, and the fourth and six carrier wave signals have an identical phase.

* * * * *